United States Patent
Yan et al.

(10) Patent No.: US 9,835,746 B2
(45) Date of Patent: Dec. 5, 2017

(54) FORMATION STABILITY MODELING

(71) Applicant: SCHLUMBERGER TECHNOLOGY CORPORATION, Sugalr Land, TX (US)

(72) Inventors: Gong Rui Yan, Beijing (CN); Florian Karpfinger, Stavanger (NO); Romain Charles Andre Prioul, Somerville, MA (US); Denis Heliot, Sugar Land, TX (US); Alexander Ramirez, Richmond, TX (US); Chang Liu, Aberdeen (GB); Thomas Berard, Richmond (GB); Walid Ben-Ismail, The Woodlands, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 366 days.

(21) Appl. No.: 14/464,819

(22) Filed: Aug. 21, 2014

(65) Prior Publication Data
US 2015/0055438 A1    Feb. 26, 2015

Related U.S. Application Data

(60) Provisional application No. 61/869,678, filed on Aug. 24, 2013.

(51) Int. Cl.
*G01V 1/28*    (2006.01)
*E21B 47/00*   (2012.01)
*E21B 49/00*   (2006.01)

(52) U.S. Cl.
CPC ............. *G01V 1/282* (2013.01); *E21B 47/00* (2013.01); *E21B 49/006* (2013.01)

(58) Field of Classification Search
CPC .... G01V 99/005; E21B 47/00; E21B 47/0006
USPC .............................. 367/73; 702/6, 1; 703/10
See application file for complete search history.

(56) References Cited

U.S. PATENT DOCUMENTS

| | | | |
|---|---|---|---|
| 5,398,215 A | * | 3/1995 | Sinha ................ G01V 1/44 367/27 |
| 8,374,836 B2 | | 2/2013 | Yogeswaren et al. |
| 2002/0010548 A1 | | 1/2002 | Tare et al. |
| 2007/0143020 A1 | | 6/2007 | Bradford et al. |
| 2010/0004866 A1 | | 1/2010 | Rabinovich et al. |
| 2011/0264429 A1 | | 10/2011 | Lee et al. |

FOREIGN PATENT DOCUMENTS

WO    2013/016470 A2    1/2013

OTHER PUBLICATIONS

Lee et al, "A wellbore stability model for formations with anisotropic rock strengths", Journal of Petroleum Science and Engineering 96-97 (2012) p. 109-119.*

Zhang, J., "Borehole stability analysis accounting for anisotropies in drilling to weak bedding planes" International Journal of Rock Mechanics and Mining Sciences, vol. 60, Jun. 2013, p. 160-170.*

(Continued)

*Primary Examiner* — Ian J Lobo
(74) *Attorney, Agent, or Firm* — Alec J. McGinn

(57) ABSTRACT

A method can include receiving data that characterizes anisotropy of a formation; receiving a model that models one or more planes of weakness in an anisotropic formation; and, based at least in part on the model and the data, outputting information germane to stability of a bore in an anisotropic formation.

20 Claims, 26 Drawing Sheets

(56) References Cited

OTHER PUBLICATIONS

Ong et al., "Influence of Anisotropies in Borehole Stability", Int. J. Rock Mech. Min. Sci. & Geomech Abstr., vol. 30, No. 7, pp. 1069-1075, 1993.*
Duveau, "A modified single plane of weakness theory for the failure of highly stratified rocks", International Journal of Rock Mechanics and Mining Sciences, vol. 35, Issue 6, Sep. 1998, pp. 807-813.
Hantschel, et al., "Fundamentals of Basin and Petroleum Systems Modeling", Springer-Verlag Berlin Heidelberg, Sec. 6.5 (FBPSM), 2009, 22 pages.
Jaeger, "Shear Failure of Anistropic Rocks", Geological Magazine, vol. 97, Issue 01, Feb. 1960, pp. 65-72.
Narayanasamy, et al., "Wellbore-Instability Predictions Within the Cretaceous Mudstones, Clair Field, West of Shetlands", SPE-124464-PA, SPE Drilling & Completion vol. 25, Issue 4, 2010, pp. 518-529.
International Search Report and Written Opinion issued in PCT/US2014/052224 on Dec. 4, 2014, 15 pages.
Thomsen, "Weak elastic anisotropy," Geophysics, SEG, vol. 51, No. 10, Jan. 1, 1986, pp. 1954-1966.
Hu, et al., "A discrete approach for anisotropic plasticity and damage in semi-brittle rocks," Computers and Geotechnics, Elsevier, Amsterdam, NL, vol. 37, No. 5, Jul. 1, 2010, pp. 658-666.
The European search report or the supplementary European search report for the equivalent European patent application 14840085.6 dated Jul. 18, 2016.
Communication pursuant to Article 94(3) for the equivalent European patent application 14840085.6 dated Aug. 4, 2016, 2016.

* cited by examiner

Image Logs                                    1310
(e.g., FMI, UBI, OBMI)
 · Bedding
 · Structural
 · Fractures < Natural
              Stress-induced Anisotropy from Sonic                          1330
(e.g., Sonic Scanner)
 • Intrinsic
   e.g., bedding, layering, crystals, etc.
 • Cracks or Fractures
 • Differential Stress

FORMATION STABILITY MODELING

RELATED APPLICATION

This application claims priority to and the benefit of a U.S. Provisional patent application having Ser. No. 61/869,678, filed 24 Aug. 2013, which is incorporated by reference herein.

BACKGROUND

A geologic formation can include material that may exhibit instability during and/or after performing an operation such as, for example, a drilling operation. For example, a drilling operation may form a bore in material that is susceptible to movement, collapse, etc. due to presence of the bore. Various technologies and techniques described herein pertain to stability and/or instability of material.

SUMMARY

A method can include receiving data that characterizes anisotropy of a formation; receiving a model that models one or more planes of weakness in an anisotropic formation; and, based at least in part on the model and the data, outputting information germane to stability of a bore in an anisotropic formation. A system can include a processor; memory operatively coupled to the processor; and one or more modules that include processor-executable instructions stored in the memory to instruct the system to receive data that characterizes anisotropy of a formation; receive a model that models one or more planes of weakness in an anisotropic formation; and, based at least in part on the model and the data, output information germane to stability of a bore in an anisotropic formation. One or more computer-readable non-transitory storage media can include computer-executable instructions to instruct a computing system to: receive data that characterizes anisotropy of a formation; receive a model that models one or more planes of weakness in an anisotropic formation; and, based at least in part on the model and the data, output information germane to stability of a bore in an anisotropic formation. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
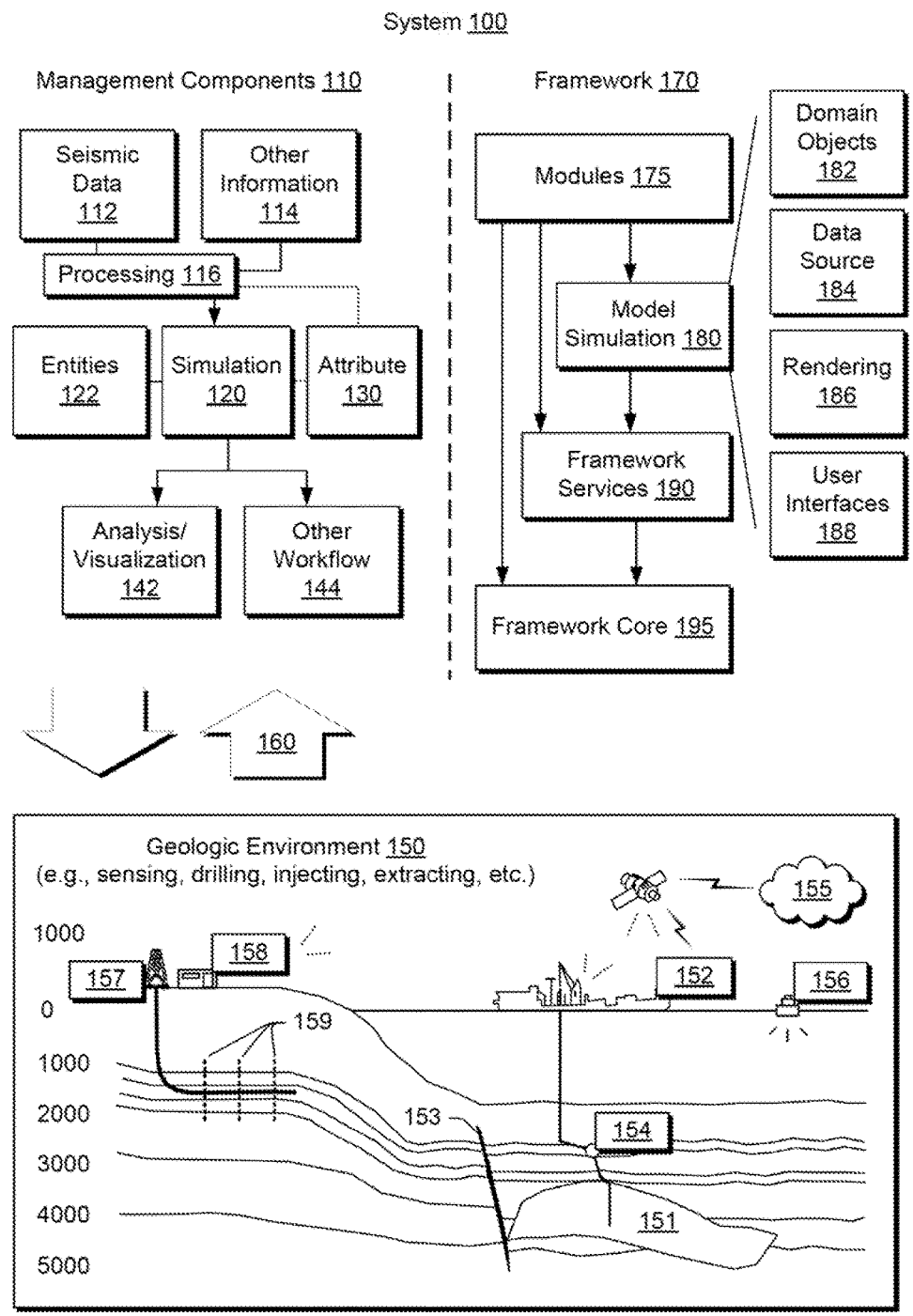
FIG. 1 illustrates an example system that includes various components for modeling a geologic environment and various equipment associated with the geologic environment.

FIG. 1 shows an example of a system 100 that includes various management components 110 to manage various aspects of a geologic environment 150 (e.g., an environment that includes a sedimentary basin, a reservoir 151, one or more fractures 153, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT™ .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL™ seismic to simulation software framework (Schlumberger Limited, Houston, Tex.). The PETREL™ framework provides components that allow for optimization of exploration and development operations. The PETREL™ framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN™ framework environment (Schlumberger Limited, Houston, Tex.) allows for integration of add-ons (or plug-ins) into a PETREL™ framework workflow. The OCEAN™ framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN™ framework where the model simulation layer 180 is the commercially available PETREL™ model-centric software package that hosts OCEAN™ framework applications. In an example embodiment, the PETREL™ software may be considered a data-driven application. The PETREL™ software can include a framework for model building and visualization. Such a model may include one or more grids.

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g. to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and that may be intersected by a fault 153. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc, to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL™ software, for example, that operates on seismic data, seismic attribute(s), etc. As an example, a workflow may be a process implementable in the OCEAN™ framework. As an example, a workflow may include one or more worksteps that access a module such as a plug-in (e.g., external executable code, etc.).

Figure 2:
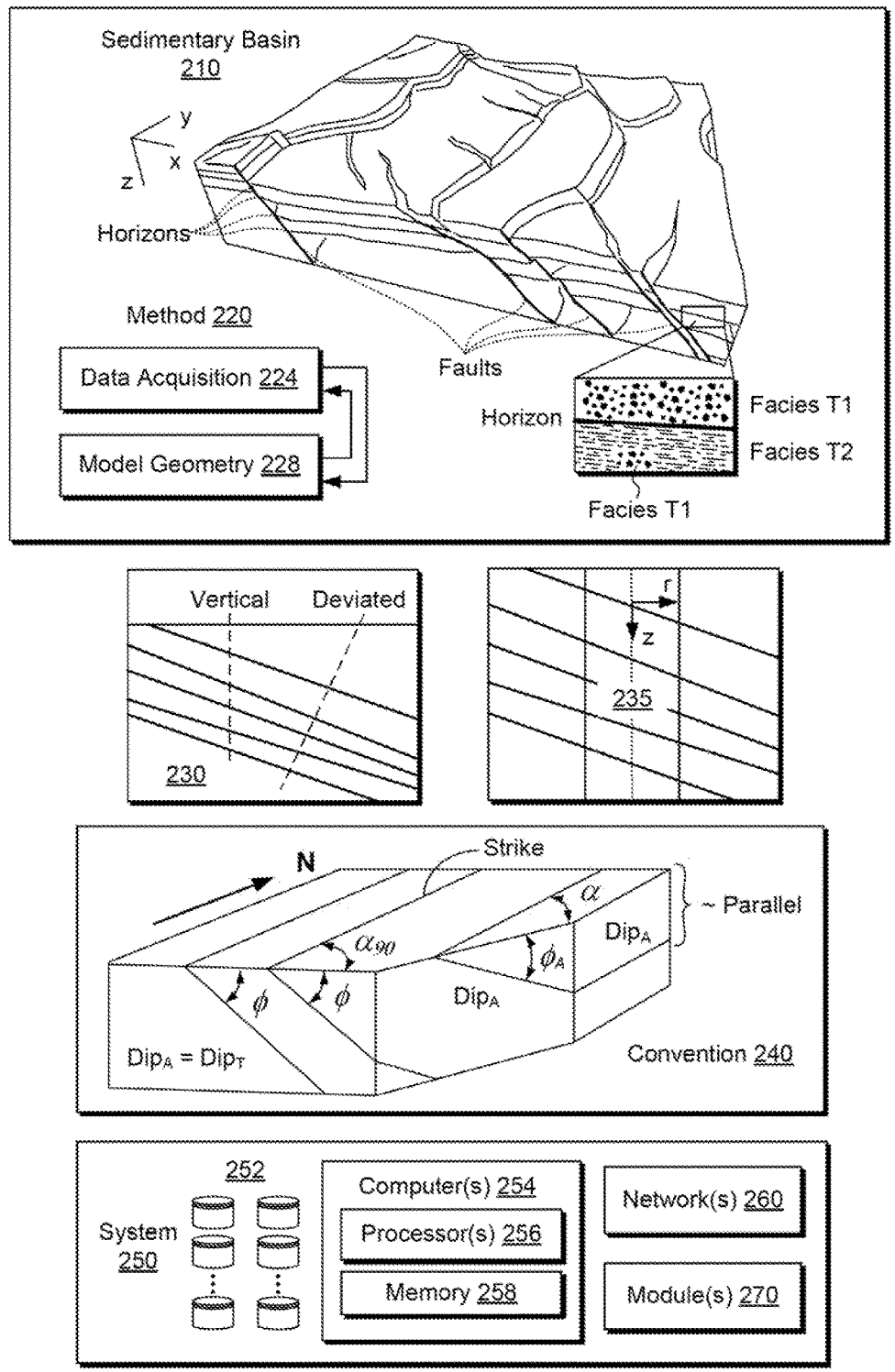
FIG. 2 illustrates an example of a sedimentary basin, an example of a method, an example of a formation, an example of a borehole, an example of a convention and an example of a system.

FIG. 2 shows an example of a sedimentary basin 210, an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling quantities such as temperature, pressure and porosity distributions within the sediments may be modeled by solving partial differential equations (PDEs) using a finite element method (e.g., or other numerical technique). Modeling may also model geometry with respect to time, for example, to account for changes stemming from geological events (e.g., deposition of material, erosion of material, shifting of material, etc.).

A commercially available modeling framework marketed as the PETROMOD™ framework (Schlumberger Limited, Houston, Tex.) includes features for input of various types of information (e.g., seismic, well, geological, etc.) to model evolution of a sedimentary basin. The PETROMOD™ framework provides for petroleum systems modeling via input of various data such as seismic data, well data and other geological data, for example, to model evolution of a sedimentary basin. The PETROMOD™ framework may predict if, and how, a reservoir has been charged with hydrocarbons, including the source and timing of hydrocarbon generation, migration routes, quantities, pore pressure and hydrocarbon type in the subsurface or at surface conditions. In combination with a framework such as the PETREL™ framework, workflows may be constructed to provide basin-to-prospect scale exploration solutions. Data exchange between frameworks can facilitate construction of models, analysis of data (e.g., PETROMOD™ framework data analyzed using PETREL™ framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230.

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles φ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is true dip' (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.).

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As shown in FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more modules 270 may include instructions (e.g., stored in memory) executable by one or more processors to instruct the system 250 to perform various actions. As an example, the system 250 may be configured such that the one or more modules 270 provide for establishing the framework 170 of FIG. 1 or a portion thereof. As an example, one or more methods, techniques, etc. may be performed using one or more modules, which may be, for example, one or more of the one or more modules 270 of FIG. 2.

Figure 3:
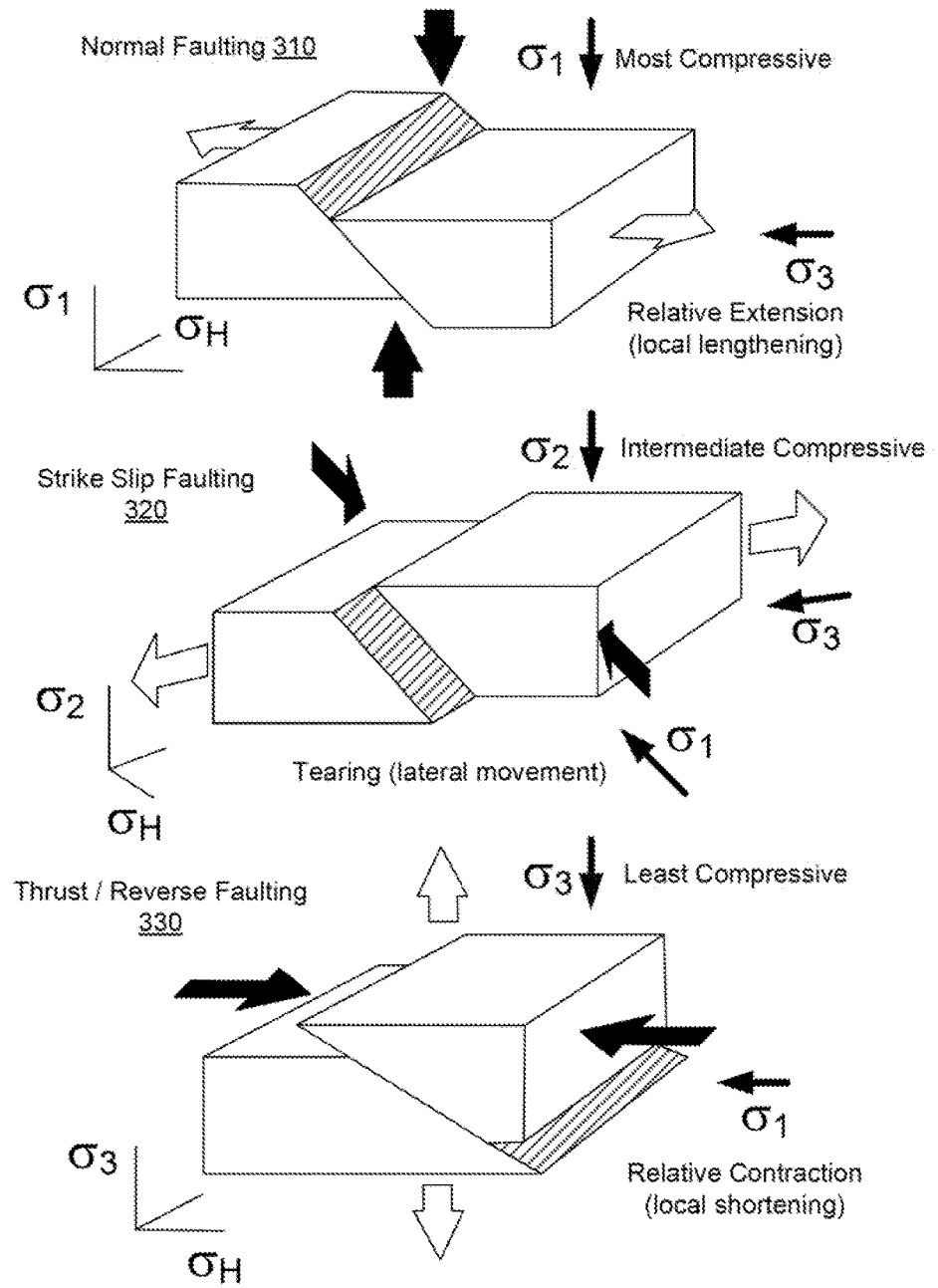
FIG. 3 illustrates an example of a tectonic regime.

FIG. 3 shows an example of a tectonic regime 300 and examples of normal faulting 310, strike slip faulting 320 and thrust or reverse faulting 330. Stress may be defined, for example, as force per unit area acting on a plane. In a solid body, for example, a stress state at a point in the solid body may be described by orientations and magnitudes of three stresses called principal stresses, which are oriented perpendicular to each other (e.g., orthogonal to each other).

As shown in FIG. 3, $\sigma_1$, $\sigma_2$ and $\sigma_3$ are compressive or tensile principal stresses where, in magnitude, 1>2>3. As an example, about a point, the three principal stresses may be shown, or represented, as an ellipsoid where the magnitude of each component defines a maximum (e.g., and a "minimum") along a respective one of the three orthogonal axes. The "minimum" is actually another maximum as compressive stress and shortening strain are considered positive in rock mechanics and structural geology because in the Earth the three principal stresses tend to be compressive (e.g., except around underground voids such as caves, very near to the Earth's surface, etc.).

The tectonic regime 300 may be defined by considering one axis being vertical. For example, a normal fault regime corresponds to $\sigma_1$ being vertical, a strike slip fault regime corresponds to $\sigma_2$ being vertical and a thrust or reverse fault regime corresponds to $\sigma_3$ being vertical. The tectonic regime 300 may also define stresses $\sigma_H$, $\sigma_h$ and $\sigma_v$ are the maximum horizontal stress ($\sigma_H$), a minimum horizontal stress ($\sigma_h$) that may be orthogonal to the maximum horizontal stress, and a vertical stress ($\sigma_v$). The orientation of the maximum horizontal stress $\sigma_H$ may be defined by an angle $\theta_H$, which may be local (e.g., for a point or a feature), far field, etc.

An earthen formation can include layers of media where elasticity of the media (e.g., in one or more layers) may be isotropic, anisotropic or isotropic in certain aspects and anisotropic in others. As an example, crustal rock may be anisotropic yet transversely isotropic "TI" (e.g., locally polar anisotropic). Knowledge of isotropy, anisotropy, etc. may assist with, for example, planning and execution of exploration and development operations of a reservoir or reservoirs within a formation. As an example, knowledge of isotropy, anisotropy, etc, may assist with, for example, drilling of one or more boreholes in a formation.

As an example of parameters that can characterize various aspects of anisotropy of media (e.g., seismic anisotropy), consider the Thomsen parameters $\epsilon$, $\delta$ and $\gamma$. The Thomsen parameter $\delta$ can describe depth mismatch between logs (e.g., actual depth) and seismic depth. As to the Thomsen parameter $\epsilon$, it can describe a difference between vertical and horizontal compressional waves (e.g., P or P-wave or quasi compressional wave qP or qP-wave). As to the Thomsen parameter $\gamma$, it can describe a difference between horizontally polarized and vertically polarized shear waves (e.g., horizontal shear wave SH or SH-wave and vertical shear wave SV or SV-wave or quasi vertical shear wave qSV or qSV-wave). Thus, the Thomsen parameters $\epsilon$ and $\gamma$ may be estimated from wave data while estimation of the Thomsen parameter $\delta$ may involve access to additional information. As an example, the parameter may represent anisotropic phenomena of a medium of interest in geophysics, some phenomena of which may be non-negligible even where anisotropy may be considered to be weak.

In a Cartesian coordinate system, a stress tensor may be defined as being represented in part by elastic coefficients. Elastic properties of various types of rock may be approximated by so-called Vertical Transverse Isotropy (VTI or TI). As an example, sedimentary rocks layering can tend to be horizontal where a resulting symmetry axis may be vertical (e.g., as for VTI). For such a system the elastic stiffness tensor can be described using five elastic coefficients: $C_{11}$, $C_{33}$, $C_{44}$, $C_{66}$ and $C_{13}$. For example, a Voigt compact representation may recast elastic coefficients to reduce an overall number of the coefficients. Such a representation may also recast indexes i, j, k and l in terms of $\alpha$ and $\beta$, for example, to arrive at an elastic modulus matrix $C_{\alpha\beta}$ as a 6×6 matrix that includes terms $C_{11}$, $C_{13}$, $C_{33}$, $C_{44}$ and $C_{66}$. As an example, values for these five elastic coefficients may allow for determination of one or more of the Thomsen parameters $\epsilon$, $\delta$ (or $\delta^*$) and $\gamma$. As an example, the Thomsen parameter $\delta$ (e.g., of $\delta^*$) may be used to characterize near vertical P-wave speed variations, angular dependence of SV-wave speed, etc. Knowledge of the Thomsen parameter $\delta$ (e.g., of $\delta^*$) may be helpful for various reasons (e.g., depth imaging/effects, media characterization, media composition, etc.).

The Thomsen parameters, as well as other parameters, may be germane to venous field activities such as drilling, well completion, seismic migration velocity model construction, wellbore stability, hydraulic fracturing design and hydraulic fracture monitoring. As an example, as to shale gas reservoirs, knowledge of anisotropy parameters can assist with planning, execution, etc., especially where one or more well configurations may vary over some range between vertical and horizontal.

As an example, anisotropy may be characterized using one or more parameters. While Thomsen parameters, elastic coefficients and compliances are mentioned, anisotropy may optionally be characterized using one or more other types of parameters, coefficients, etc. As an example, one or more layers, media, etc. of a formation may be characterized with respect to one or more of isotropy, anisotropy, VTI, etc.

As an example, a method may include characterizing anisotropy with respect to one or more mechanical rock properties such as, for example, elastic, poroelastic, poromechanics, strength (e.g., under compression and/or tension), etc.

As an example, a method may include modeling wellbore stability and/or instability. For example, a system may include modules stored in memory (e.g., a non-transitory memory device) where the modules include instructions executable by a processor to model wellbore instability as may relate to, for example, drilling in one or more anisotropic formations. Such a model may be referred to, as an example, as a Modified Plane-of-Weakness (MPoW) model. For example, such a model may consider Jaeger's Plane-of-Weakness (PoW) failure criterion (e.g., to identify onset of rock sliding along a weak plane) and effect of active shearing (e.g., to determine whether the onset sliding at a borehole wall will develop and cause borehole instability). As to the latter, a model may provide for modeling structural behavior of laminated/fractured formation intersected by a borehole.

As an example, a method can include implementing a MPoW model. For example, in various trials, a method implemented an example of a MPoW model to generate results. Some examples of results are presented herein.

As an example, a method can include an algorithm that includes near borehole stress modeling (e.g., to map the stress distribution induced by drilling) and target mud weight (e.g., to prevent failure) inversion (e.g., to solve for one or more thresholds not to be exceeded to ensure a physical reasonable solution in formation rock subject to geo-stress conditions). As an example, a method may be implemented as part of one or more workflows. For example, a workflow may include near borehole stress modeling. Such a method may include determining one or more target mud weights. As an example, a method may include drilling, delivery mud, etc., for example, based at least in part on near borehole stress modeling.

Figure 4:
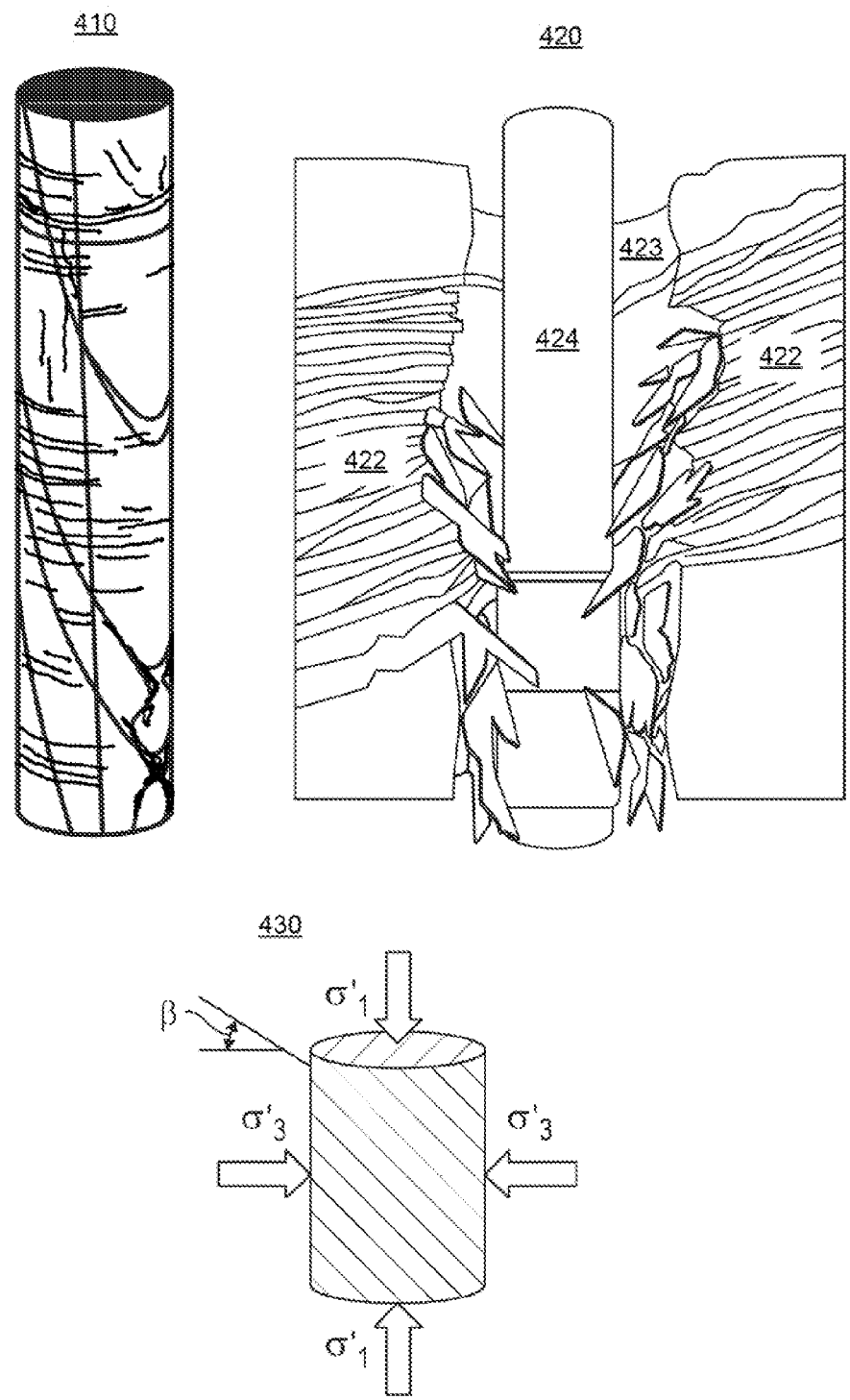
FIG. 4 illustrates examples of formations and a model.

FIG. 4 shows an example of core data 410, an approximate graphic of laminations about a bore that may fail 420, and an example graphic associated with the aforementioned Jaeger Potty approach 430. The graphic 430 shows an angle for layers as well as directions of stresses.

As an example, a tool may be positioned in a borehole, for example, to acquire information. As an example, a borehole tool may be configured to acquire electrical borehole images, for example, consider the fullbore Formation Micro-Imager (FMI) tool (Schlumberger Limited, Houston, Tex.), which can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, information may be acquired about a formation using seismology, for example, to acquire seismic data. As mentioned, seismic data may be processed using a framework such as, for example, the PETREL™ framework. As an example, such a framework may include one or more interfaces for receipt of seismic data, imagery data, etc. Such a framework may include one or more modules with instructions executable to process received data. As an example, seismic data may optionally be analyzed to determine one or more parameters, which may include one or more parameters that characterize anisotropy.

In FIG. 4, the core data 410 may be or include data acquired using a tool positioned in a borehole. The core data 410 may be a cylindrical surface of data, for example, representative of a surface of a borehole. As an example, a tool may include circuitry to image a region at and/or beyond a surface of a borehole (e.g., to a depth or depths from a surface of a bore hole into material). As an example, core data may include one or more types of data as acquired by a tool or tools positioned in a borehole.

Bores drilled through laminated rocks like shales and, in particular, deviated bores such as lateral bores (e.g., horizontal wells), may be less stable than comparable bores drilled into non-laminated rocks. Such bores may exhibit borehole instability issues that can elevate drilling operation costs. Bores drilled through naturally fractured formations may also be more challenging from a borehole stability point of view than wells drilled through un-fractured formations. As an example, a bores drilled into an artificially fractured formation may present challenges from a borehole stability point of view when compared to a bore drilled into a formation that has not been artificially fractured (e.g., prior to hydraulic fracturing, eta). While shale is mentioned as an example of rock, other types of rock may be analyzed with respect to stability and/or instability.

Referring to the graphic 420, a layer 422 of laminated material (e.g., laminations) is shown where material from the layer 422 has entered a bore 423, for example, in an annular region about equipment 424 (e.g., drilling or other equipment). In the example graphic 420, which is shown in a cutaway view, material from the left side and material from the right side have entered the bore 423. As an example, where the angle of the layer 422 is steeper with respect to a longitudinal axis of the bore 423, entry of material may differ. As an example, entry of material may depend on various factors (e.g., geometry of a bore, operation of equipment in a bore, forces in material adjacent a bore, far field forces, etc.).

As an example, an angle may be an "attack angle", for example, defined by an angle between a bore axis and one or more bedding planes. As an example, a method may include analyzing data to estimate an attack angle that may be greater than an angle that may predictably present bore instability. As an example, a method may include analyzing data to determine an attack angle for a bore to be drilled into a particular formation where the determined attack angle exceeds an attack angle of about 20 degrees, for example, to avoid weak-plane related bore instability issues in the particular formation.

As illustrated by the graphic 420, material may not be isotropic and/or homogeneous at or proximate to a bore. As an example, material may be anisotropic and/or inhomogeneous (e.g., heterogeneous). As an example, a model may account for laminated and/or fractured rocks, for example, accounting for presence of fractures and/or bed interfaces, for example, as pre-existing planes of weakness.

The aforementioned Jaeger PoW model considers the Mohr-Coulomb criterion to describe shear sliding failure of weakness planes and also for intact rock matrix yielding (see, e.g., Jaeger, J. C., Shear failure of anisotropic rocks. Geol. Mag., 1960, 97, 65, which is incorporated by reference herein). Such an approach may, at times, provide for approximating, as a prediction, onset of failure (e.g., yielding or sliding) at one position around a bore; however, it does not provide for prediction as to whether yielding/sliding may develop and, for example, cause borehole failure or not.

Another model by Duveau and Shao adheres to the approach of the Jaeger model by considering shear failure along the weakness plane as the principal mechanism of sliding; while using a different model for intact rock matrix shear failure (see, e.g., G, Duveau, J. F. Shao, "A Modified Single Plane of Weakness Theory for the Failure of Highly Stratified Rocks", Int. J. Rock Mech. Min. Sci. Vol. 35, No. 6, 1998, which is incorporated by reference herein). As such, both the Duveau and Shao model and the Jaeger model are limited in that they fail to provide predictions as to whether onset of sliding at one position may develop and, for example, cause borehole failure.

As an example, a model may provide for prediction of borehole stability (e.g., and/or instability) in a laminated and/or fractured formation. As an example, such a model may be implemented as part of a workflow, for example, to plan drilling, guide drilling, develop a resource, etc. As an example, a model may be implemented in real-time or near real-time, for example, during a drilling or other operation.

As an example, a drilling operation may include implementing a model such as the aforementioned modified PoW model (MPoW), for example, to assess stability, to assess fluid dynamics, to determine one or more drilling fluid parameters, to control of equipment, etc.

As an example, shear sliding failure along fractures and/or weak planes intersecting a wellbore may be a wellbore instability mechanism that can have a considerable impact on one or more operations. As an example, such failure phenomena may not be characterized through use of borehole stability criteria for homogeneous isotropic rocks alone (e.g., Mohr-Coulomb, Hoek-Brown. Mogi-Coulomb et al.) as one or more borehole failure mechanisms in laminated and/or fractured formations may differ from those associated with strictly isotropic or homogenous formations.

As an example, the aforementioned MPoW model can address structural failure mechanisms of a borehole drilled in laminated and/or fractured formations. For example, a MPoW model may consider one or more of:

Shear stress acting on a weakness plane has potential to cause rock sliding along the weakness plane;

Active shearing (shear stress direction towards the free surface, e.g., borehole wall) can possibly develop and lead to structural sliding and thus borehole failure;

Passive shearing (shear stress direction toward the inner formation rock) has little to no potential to cause structural failure of borehole (e.g., entire structure of a weakness plane intersected by a borehole may be evaluated to model such structural stability);

Fluid penetration and/or other drilling operation effects like temperature diffusion between drilling mud circulating or static inside the borehole and the surrounding formation may be accounted for (e.g., a model may include features to describe pressure changes on a weak plane (fractures) to account fluid penetration effect, a model may account for one or more of liquefaction (liquefaction), surface tension effects, etc.; a model may account for vibration, settling, drilling fluid/mud, surge, swab, vibrator sweep, etc.);

Intact rock matrix failure (e.g., yielding or tensile) may be a type of failure mechanism that can dominate borehole stability conditions in some cases (e.g., borehole intersects a weak plane in favorite direction, which may be modeled by a continuum model approach). As an example, a continuum model for a wellbore stability model may consider formation rock as a homogeneous isotropic continuum material and may use the isotropic near borehole induce stress model, together with isotropic borehole failure criteria such as Mohr-Coulomb; whereas, in laminated and/or fractured rocks these models may not be valid as borehole failure may occur along a weak plane, for example, caused by rock anisotropy.

As an example, a MPoW model may model borehole instability for drilling through laminated and/or fractured formations. As an example, influences of formation rock laminated and/or fractured directions, as well as drilling experience may be investigated by using a system that includes a MPoW model. As an example, a workflow to analyze and predict wellbore instability in laminated and/or fractured formation using log and/or core and/or cuttings and/or drilling measurements as input may include use of a MPoW model.

As an example, a system may allow for analysis and prediction of borehole instabilities in laminated and/or fractured formations, for example, to enable a workflow that may include acquiring data to characterize a given formation properties (existence, orientation of planes of weakness, far field stress) and outputting information germane to one or more operations (e.g., planned, on-going, already performed, etc.).

As an example, a workflow may provide for investigation of near borehole induced stress, the stress state resolved on weakness planes and the resulting shear/sliding direction, the activation of various failure mechanisms and their respective severity, for any given borehole orientation under the complex formation anisotropic (laminated and fractured) and in situ stress environment. As an example, through inversion, a method may include determination of one or more critical well pressures (e.g., to prevent borehole from instability) and mud weight window, which may thereby provide for one or more actions to mitigate one or more identified instabilities for drilling effectively and safely. As an example, a method may provide for functionalities for wellbore trajectory optimization, for example, by considering mechanical stability in challenging conditions. As an example, a method may include providing assessment techniques for conducting borehole stability sensitivity analysis, for example, with regard to geomechanical properties of the subsurface.

As an example, a model (e.g., a geomechanical model) may provide for modeling and predicting borehole instability in laminated and/or fractured formations. As an example, such a model may be implemented using one or more computing devices, for example, to allow for optimizing mud weight design by considering anisotropy; diagnosing wellbore instability; providing drilling practice guidance to mitigate instability issues in challenged environments; etc. Such an approach may be applicable for use in what may be considered challenging wells, for example, to extend understanding and modeling capability in drilling in anisotropic formations.

As an example, a workflow can include analyzing and predicting wellbore instabilities in wells drilled through laminated and/or fractured formation based on data from logs and/or cores and/or cuttings and/or drilling information. Such a workflow may include acquiring data to characterize a given formation properties (existence, orientation of planes of weakness, far field stress, etc.), modeling instabilities, analyzing modeling results, modifying operational parameters to avoid or manage the instability, etc.

As an example, data may be obtained from a log while drilling and/or from wireline logs (after drilling) and/or from core/sidewall cores and/or from cuttings and/or from drilling data (e.g., in a wellbore of interest).

As an example, data may be obtained from a log while drilling and/or from wireline logs (after drilling) and/or from a core/sidewall core and/or cuttings and/or drilling data in a near-by well or a pilot well. As an example, one or more approaches may be applied to a shale play. For example, a shale play may include a few vertical wells with a log of data from which a method may include deciding in which layer/at which depth (e.g., possibly in which direction) to drill one or more laterals (e.g. into a shale layer, etc.). As an example, one or more lateral bores may be used for performing one or more fracturing operations, which, in turn, may alter one or more characteristics of a formation germane to bore stability. As an example, a method may include re-analyzing stability and/or instability with respect to one or more bores after performing a fracturing operation (e.g., consider a stage in a series of stages of a fracturing scheme). As an example, a method may include re-analyzing stability and/or instability with respect to one or more bores after a period of drainage of fluid from a drainage area (e.g., consider a drainage area associated with a fractured region). As an example, data may be obtained from regional knowledge, outcrop data or use of an analog.

As an example, a model may include equations, for example, as part of an algorithm for predicting wellbore failure as a function of a plane of (at least, but not limited to) weakness orientation, wellbore orientation and stress.

As an example, a method may include comparing results of modeling with observed failure information and, for example, updating input to the model accordingly.

As an example, a method may involve predicting instability as a function of mud weight or borehole pressure. For example, a method may account for pressure change related to drilling operations (e.g., trip in/out). As an example, a method may consider whether equivalent circulating numbers are covered under mud weight (e.g., where covered under pressure).

As an example, a method may include predicting instability as a function of wellbore orientation. As an example, a post-mortem analysis of one or more bores may be carried out to optimize future well stability.

As an example, a method may include recommending a change in mud weight, an optimization of well trajectory (deviation, azimuth), a change in drilling operation (e.g., to minimize pressure fluctuation when tripping in/out of the whole), a hole clean-up operation, an optimized cementing or completion operation or production schedule, etc. For example, an optimized completion operation may be a hydraulic fracture optimized to account for existence of one or more planes of weakness. In such an example, analysis of observed failures along an existing plane of weakness may be an input into a model, for example, as to interaction of a hydraulic fracture with one or more natural fractures.

As an example, a method may aim to predict a drilling mud weight window. As to various issues, consider large size and volume of cavings/cuttings causing hole cleaning problems and potentially stuck pipe and, for example, restricted circulation/increase in pump pressure that can cause loss circulation and/or borehole collapse.

As an example, mud may be or include drilling fluid. Such fluid can include suspended solids, emulsified water and/or oil. Mud may be or include a type of drilling fluid such as, for example, water-based, oil-based and synthetic-based.

As an example, mud may be defined as having a mass per unit volume (e.g., a mud density). As an example, a mud weight may be reported in lbm/gal (e.g., ppg), kg/m$^3$ or g/cm$^3$ (also called specific gravity or SG), lb/ft$^3$ or in hydrostatic gradient, lb/in$^2$/ft (psi/ft) or pptf (psi/1000 ft). Mud weight (density) test procedures using a mud balance have been standardized and published by the American Petroleum Institute (API).

Figure 5:
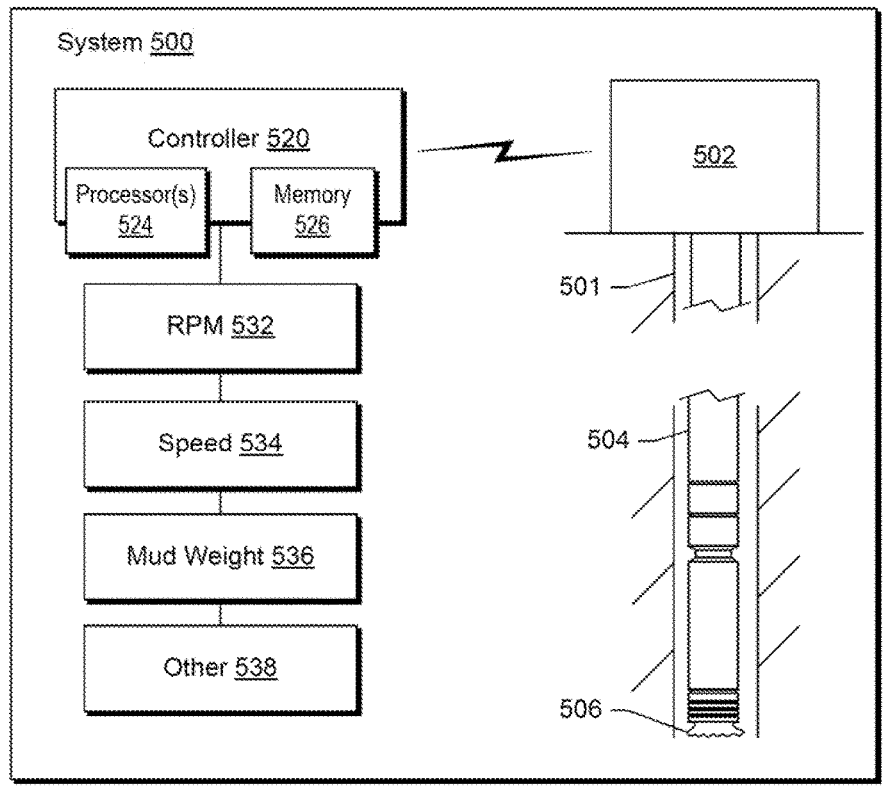
FIG. 5 illustrates an example of a system and an example of a method.
Figure 5:
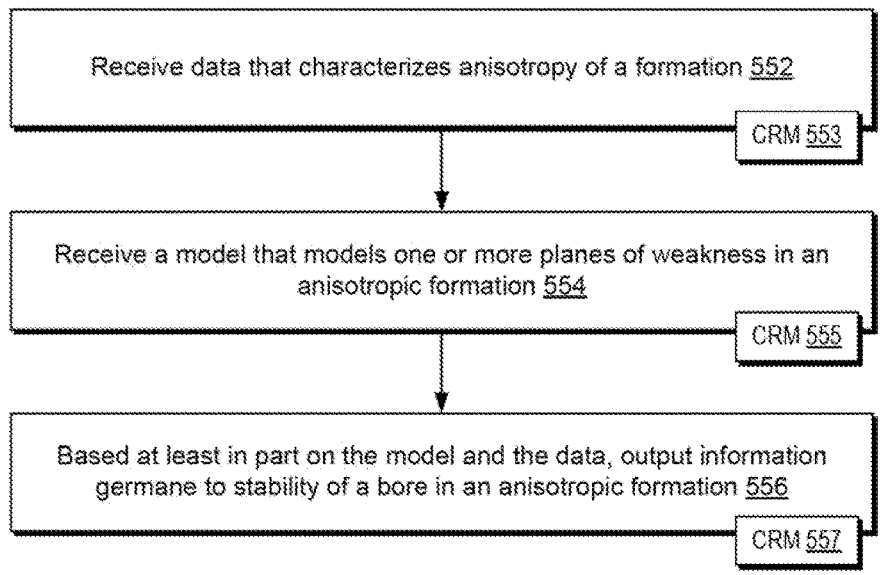

FIG. 5 shows an example of a system 500 that may respond to input received via one or more interfaces (e.g., wired and/or wireless). In the example of FIG. 5, the system 500 includes drilling equipment 502, 505 and 506 positioned with respect to a well 501 being drilled. A controller 520 includes one or more processors 524 (e.g., processing cores, etc.) and memory 526. The controller 520 may be local or remote with respect to the well 501 and include one or more interfaces for communication with at least some of the drilling equipment 502. As an example, the controller 520 may include one or more modules for controlling rotational speed 532, directional speed 534, mud weight 536 or other aspects of a drilling process 538.

FIG. 5 also shows an example of a method 550 that includes a reception block 552 for receiving data that characterizes anisotropy of a formation; a reception block 554 for receiving a model that models one or more planes of weakness in an an isotropic formation; and an output block 556 for outputting, based at least in part on the model and the data, information germane to stability of a bore in an anisotropic formation. The method 550 is shown along with blocks 553, 555 and 557, which may represent computer-readable non-transitory storage media that include computer-executable instructions to instruct a computing system to perform operations. For example, the block 553 can include instructions to instruct a system to receive data that characterizes anisotropy of a formation; the block 555 can include instructions to instruct a system to receive a model that models one or more planes of weakness in an anisotropic formation; and the block 557 can include instructions to instruct a system to output, based at least in part on a model and data, information germane to stability of a bore in an anisotropic formation. As an example, the blocks 553, 555 and 557 may be modules such as modules of the modules 270 of the system 250 of FIG. 2. As an example, the blocks 553, 555 and 557 may be stored in memory, for example, consider the memory 258 of the system 250 of FIG. 2, the memory 526 of the controller 520, etc.

In the method 550, the anisotropy can be or include anisotropy of mechanical rock properties or a formation. For example, consider one or more of anisotropy of elastic properties, poroelastic properties, poromechanical properties and strength properties.

As an example, poromechanics may refer to continuum mechanics and acoustics associated with behaviors of fluid-saturated porous media. A porous medium or a porous material may be a solid (e.g., a matrix) permeated by an interconnected network of pores (e.g., voids) that may be filled with a fluid (e.g., liquid or gas). A matrix and pore network may, for example, be considered continuous so as to form two interpenetrating continua. As an example, a porous medium with a solid matrix that is elastic that includes pore fluid that is viscous may be referred to as being poroelastic. As an example, a poroelastic medium may be characterized by its porosity, permeability as well as properties of its constituents (e.g., solid matrix and fluid(s)).

As an example, a model may be a geomechanical model. As an example, a geomechanical model may be or include one or more of an elastic model, a poroelastic model, a poromechanical model, a thermomechanical model, etc.

As an example, a method may be implemented that can include modeling one or more thermal phenomena. For example, consider modeling of temperature such as temperature diffusion between (a) mud circulating and/or static mud inside a borehole and (b) surrounding formation. Such a method may apply to a high pressure and/or high temperature operation. For example, a harsh environment may be classified as being a high-pressure and high-temperature environment (HPHT). A so-called HPHT environment may include pressures up to about 138 MPa (e.g., about 20,000 psi) and temperatures up to about 205 degrees C. (e.g., about 400 degrees F.), a so-called ultra-HPHT environment may include pressures up to about 241 MPa (e.g., about 35,000 psi) and temperatures up to about 260 degrees C. (e.g., about 500 degrees F.) and a so-called HPHT-hc environment may include pressures greater than about 241 MPa (e.g., about 35,000 psi) and temperatures greater than about 260 degrees C. (e.g., about 500 degrees F.). As an example, an environment may be classified based in one of the aforementioned classes based on pressure or temperature alone. As an example, an environment may have its pressure and/or temperature elevated, for example, through use of equipment, techniques, etc. For example, a SAGS operation may elevate temperature of an environment (e.g., by 100 degrees C. or more).

As an example, a method may include analyzing a formation with respect to a borehole where such analyzing accounts for operation of one or more pieces of equipment in the borehole. For example, consider a pump such as an electric submersible pump (ESP), which may alter pressure, fluid flow, etc. as fluid is pumped by the pump. As an example, an analysis may determine stability and/or instability of a borehole during operation, after operation, etc. of such a pump. As another example, consider a downhole steam generator that may generate steam in a borehole. An analysis may determine stability and/or instability of a borehole during operation, after operation, etc. of such equipment.

As an example, a system can include a processor; memory operatively coupled to the processor; and one or more modules that include processor-executable instructions stored in the memory to instruct the system to receive data that characterizes anisotropy of a formation; access a model that models one or more planes of weakness in an anisotropic formation; and, based at least in part on the model and the data, output information germane to stability of a bore in an anisotropic formation.

As an example, one or more computer-readable storage media can include processor-executable instructions to instruct a system where the instructions include instructions to receive data that characterizes anisotropy of a formation; receive a model that models one or more planes of weakness in an anisotropic formation; and, based at least in part on the model and the data, output information germane to stability of a bore in an anisotropic formation. As an example, a system can receive data and/or a model via an interface or interfaces, which may receive data from a storage device of the system, a storage device coupled to the system, etc. (e.g., via a network or networks).

Figure 6:
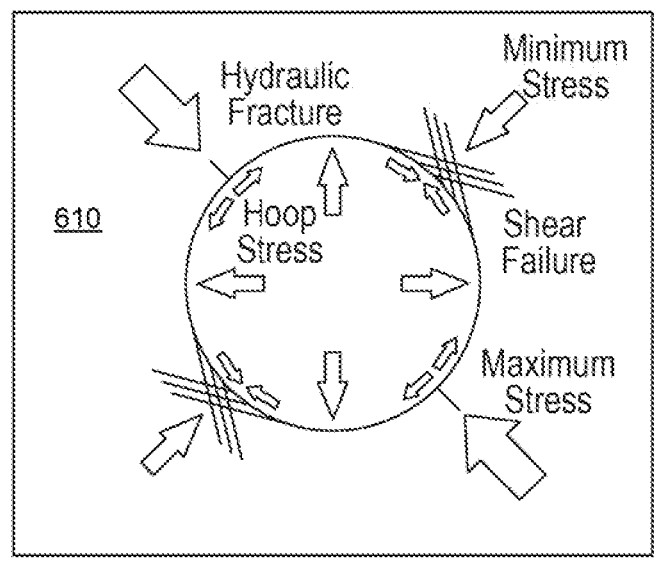
FIG. 6 illustrates examples of stresses.
Figure 6:
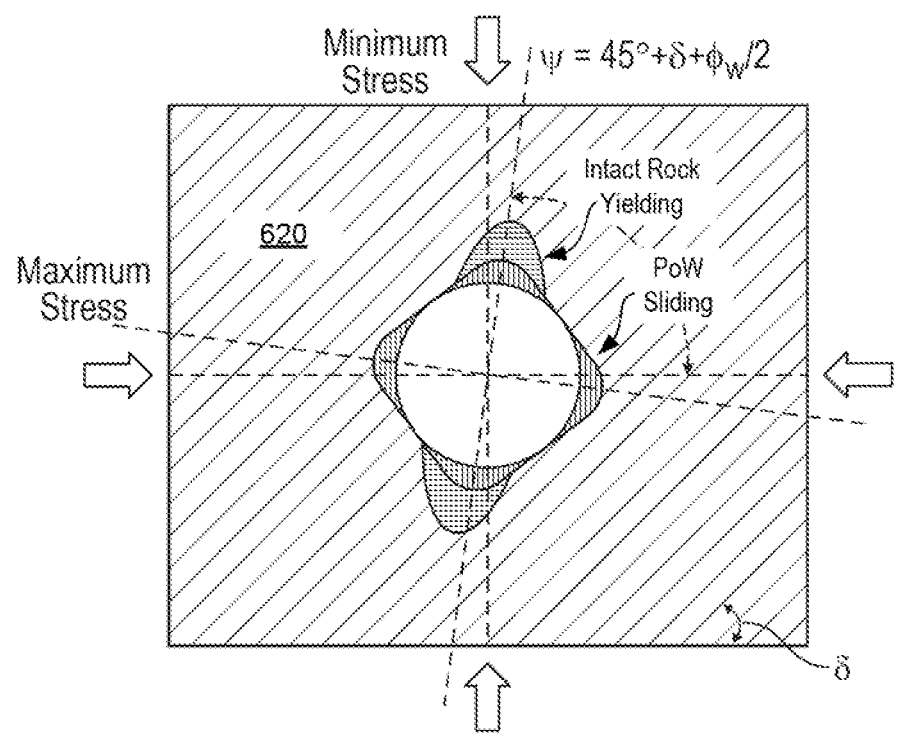

FIG. 6 shows a graphic 610 and a graphic 620. As an example, a wellbore stability (WBS) analysis can consider a formation as a homogeneous isotropic material using an isotropic near wellbore stresses model (e.g., Kirsch solution) together with isotropic borehole failure criteria to model borehole stability. Anisotropy failure and instability may be controlled by near borehole stress and, far example, by layered/fractured formation (strength anisotropic) and the borehole structure.

Stress may be defined as a tensor, which, as explained, a state of stress at a point in a formation may be defined by three stresses (e.g., orthogonal stresses). For example, FIG. 3 illustrates stresses as associated with the tectonic regime 300. As mentioned, parameters such as the Thomsen parameters, elastic coefficients and compliances may be used to characterize a formation.

As an example, overburden stress may be a largest and act vertically while the so-called maximum and minimum horizontal stresses may be far field stresses. By drilling a hole and removing the supporting rock, the state of stress in vicinity of a bore may be altered. As an example, pressure in a mud column can help support a bore (e.g., provide support to material forming a bore wall). In such an example, there may be a concentration of stress on the sides of the bore in the direction of the minimum horizontal stress and, if the mud weight is too low, the rock may fracture and breakout. However, if the mud weight is too high, tensile stress on the bore wall in the direction of maximum horizontal stress may be sufficient to overcome the tensile strength of the rock and a fracture may result. As an example, a method may include determining one or more mud weights, which may be, for example, one or more optimum mud weights for a bore (e.g., at a location in the bore, at a time in the bore, during an operation involving the bore, etc.). As an example, a method may include determining one or more angles for a bore with respect to a feature or features of a formation and determining one or more mud weights.

Figure 7:
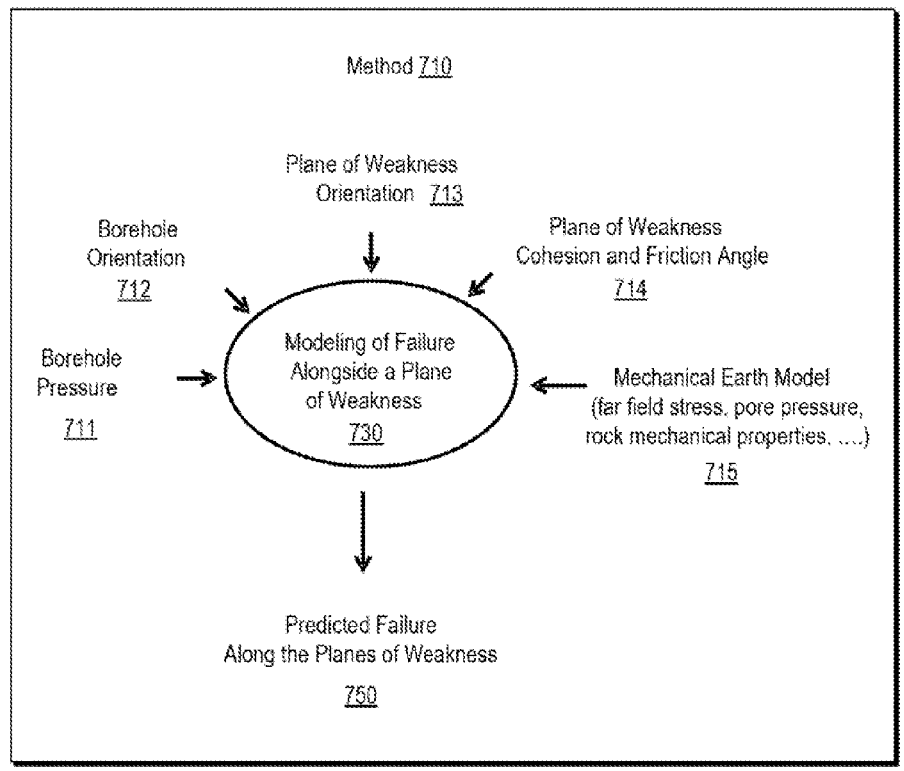
FIG. 7 illustrates an example of a method that may include a modified plane of weakness model (e.g., a MPoW model)

FIG. 7 shows an example of a method 710 that includes receiving information such as, for example, borehole pressure information 711, borehole orientation information 712, plane of weakness (PoW) orientation information 713, plane of weakness (PoW) cohesion and friction angle information 714, mechanical earth model (MEM) information 715 (e.g., far field stress, pore pressure, rock mechanical properties, etc.), etc. The method 710 can include modeling of failure alongside a plane of weakness (PoW) 730 and, for example, outputting predicted failure information 750, for example, predicted failure along one or more planes of weakness. As an example, the method 710 can be a method for forward modeling of one or more aspects of borehole failure in the presence of one or more planes of weakness.

In the example of FIG. 7, a model may be provided such as the aforementioned MPoW model for modeling of failure (e.g., stability and/or instability), for example, as to a plane or planes of weakness (e.g., with respect to a bore) to output one or more predicted values (e.g., that characterize a failure or failures).

The method 710 may be associated with computer-readable media (CRM) blocks. Such blocks can include instructions suitable for execution by one or more processors (or processor cores) to instruct a computing device or system to perform one or more actions (see, e.g., the one or more modules 270 of FIG. 2). A single medium may be configured with instructions to allow for, at least in part, performance of various actions of the method 710. As an example, a computer-readable medium (CRM) may be a computer-readable storage medium (e.g., a non-transitory medium).

As an example, borehole orientation may come from a well plan or from a survey or from inclinometry measurements performed by one or more logging tools. As an example, borehole pressure may be a user input or a measurement. As to orientation of a plane of weakness, it may be determined from one or more borehole images: FMI images, ultrasonic borehole images (UBI), resistivity images (e.g., GVR, etc.), etc. (see, e.g., FIG. 13). As an example, orientation may come from deep resistivity measurements such as measurements associated with RT SCANNER™ triaxial induction services (Schlumberger Limited, Houston Tex.), PERISCOPE™ bed boundary mapping services (Schlumberger Limited Houston Tex.), etc.; orientation may also be inferred from sonic measurements. As to in situ stress, it may come from regional/field knowledge, or be derived from logs (e.g., sonic); existing failure (and absence of failure) along the borehole may also help determine such values.

As an example, a MPoW model may address one or more structural failure mechanisms of shear sliding failure. As an example, such a model may account for shear stress acting on a weakness plane with potential to cause sliding; active shearing (shear stress towards the free surface, e.g., borehole wall) that can possibly develop and lead to structural sliding and borehole failure; passive shearing (toward the inner formation rock) that may have little to no potential to cause structural failure of borehole; whole section of weakness plane around a borehole evaluation to model structural stability; fluid penetration; temperature diffusion; other drilling operation effects on wellbore instability; etc. As an example, a model may model whole section of weakness plane around a borehole that may be evaluated to model such structural stability; fluid penetration effects; temperature diffusion effects on borehole stability; one or more drilling operation effects on borehole instability, etc.

As an example, in a near borehole area, a model may include a steady-state thermal diffusion condition in a radial direction (e.g., to decouple deformation effort on thermal flow) In such an example, the thermal effort on borehole stability may be described as applying "an additional induced stress" on the formation rocks. For example, consider the following set of equations:

$$\Delta \sigma_{\gamma\gamma}^T = \alpha_m \frac{E}{6(1-v)} \frac{r^2 - a^2}{r^2} T(r)$$

$$\Delta \sigma_{\theta\theta}^T = \alpha_m \frac{E}{6(1-v)} \frac{r^2 - a^2}{r^2} T(r)$$

$$\Delta \sigma_{\alpha\alpha}^T = v(\Delta \sigma_{\gamma\gamma}^T + \Delta \sigma_{\theta\theta}^T) + E\alpha_m T(r)$$

where T(r) represents formation temperature changes from an initial condition (e.g., as function of radial distance r), $\alpha_m$ represents a volumetric thermal expansion coefficient of rock, and E and v are Young's modulus and Poisson's ratio, respectively.

As an example, a model can include equations that can account for one or more of mechanical stress (e.g., in situ stress), pore pressure and borehole pressure, and thermal effects. As an example, a model can include equations that can account for shear failures through a rock matrix as well as along one or more bedding planes. As an example, a model may include one or more parameters, terms, etc. that are based at least in part on measured and/or observed information. For example, consider data acquired via tests for rock failure where, for example, such failure may be attributed to at least in part, shear failure through a rock matrix as well as along one or more bedding planes.

As an example, a model may be a geomechanical model, which includes one or more terms that can account for anisotropy. As an example, one or more properties of a material (e.g., rock, rock with fluid, etc.) may be specified with respect to a direction or directions. For example, a material may be defined with respect to a coordinate system to specify a property of the material in one direction definable using the coordinate system which may differ from a property of the material in another direction definable using the coordinate system. As an example, a method may include analyzing a formation with respect to a bore that may be drilled into or otherwise formed in the formation. As an example, a method may include determining how to drill a bore into a formation where the bore has reasonable stability with respect to risk of failure due to one or more phenomena pertaining to material that at least partially borders the bore.

Figure 8:
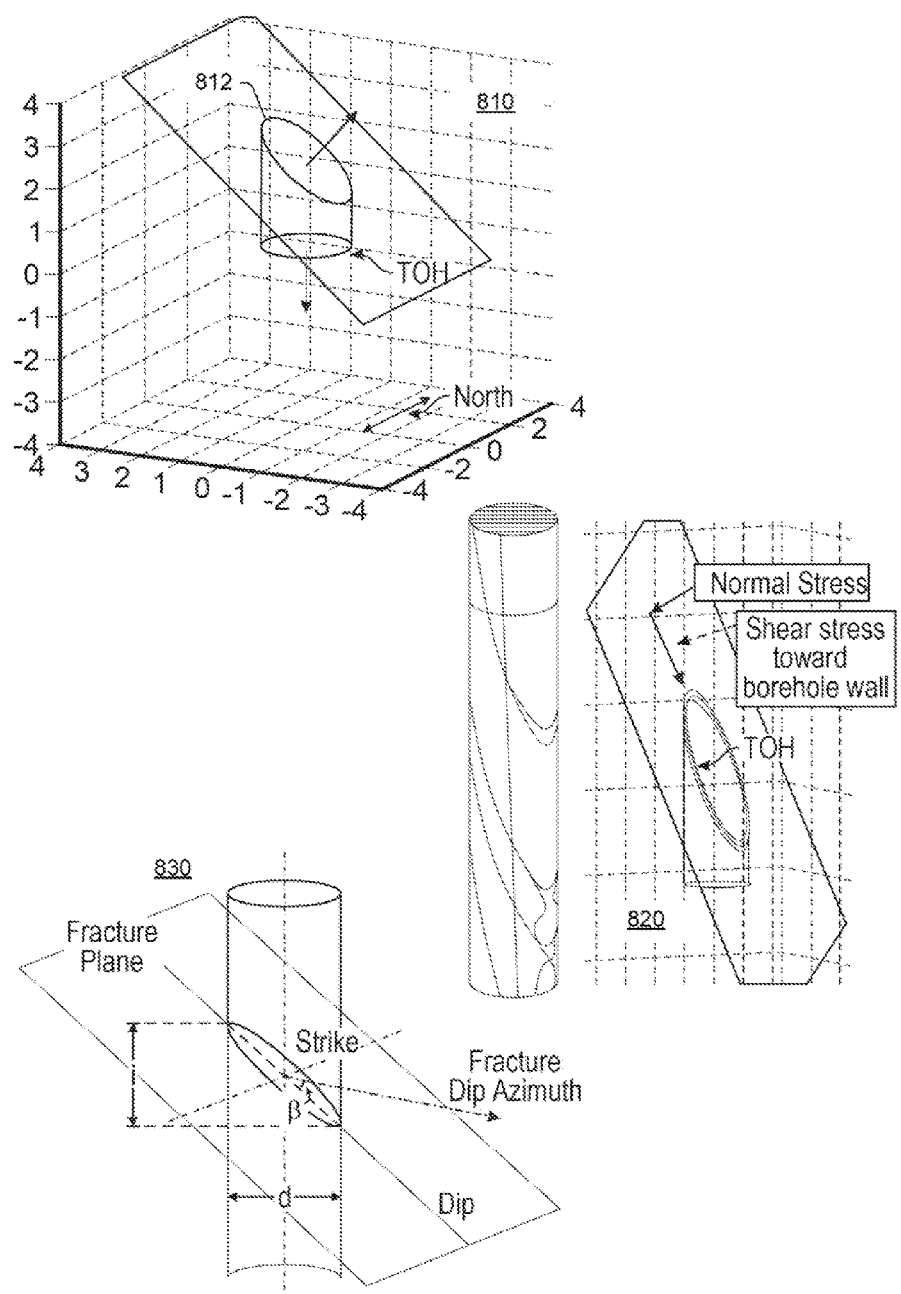
FIG. 8 illustrates some examples of orientations and data as to a bore and an environment (e.g., formation about the bore)

FIG. 8 shows some example plots 810, 820 and 830 that show orientations and data as to a bore 812 and an environment (e.g., formation about the bore). As an example, a modified PoW model (MPoW) may be implemented in a method for addressing one or more structural failure mechanisms of shear sliding failure. As an example, a MPoW model can model: shear stress that acts on a weakness plane that has potential to cause sliding; active shearing (e.g., shear stress towards a free surface such as a borehole wall) that can possibly develop and lead to structural sliding and borehole failure; passive shearing (e.g., toward an inner formation rock) that may have little potential to cause structural failure of a borehole; whole section of weakness plane around a borehole that may be evaluated to model such structural stability; fluid penetration effects on borehole stability; and one or more drilling operation effects on borehole instability.

Figure 9:
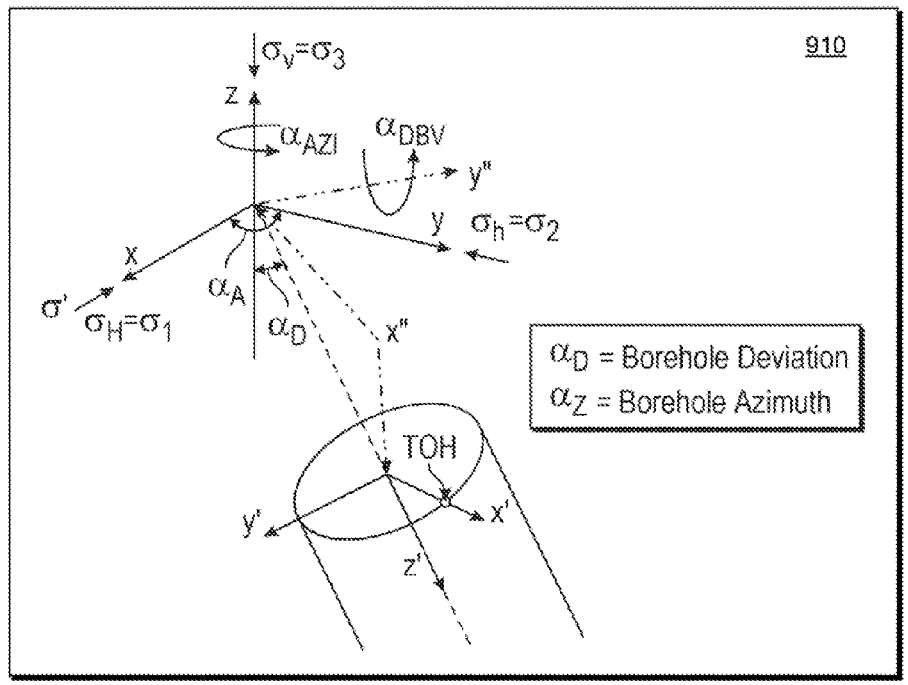
FIG. 9 illustrates some examples of an inclined bore in an anisotropic formation in an anisotropic stress environment.
Figure 9:
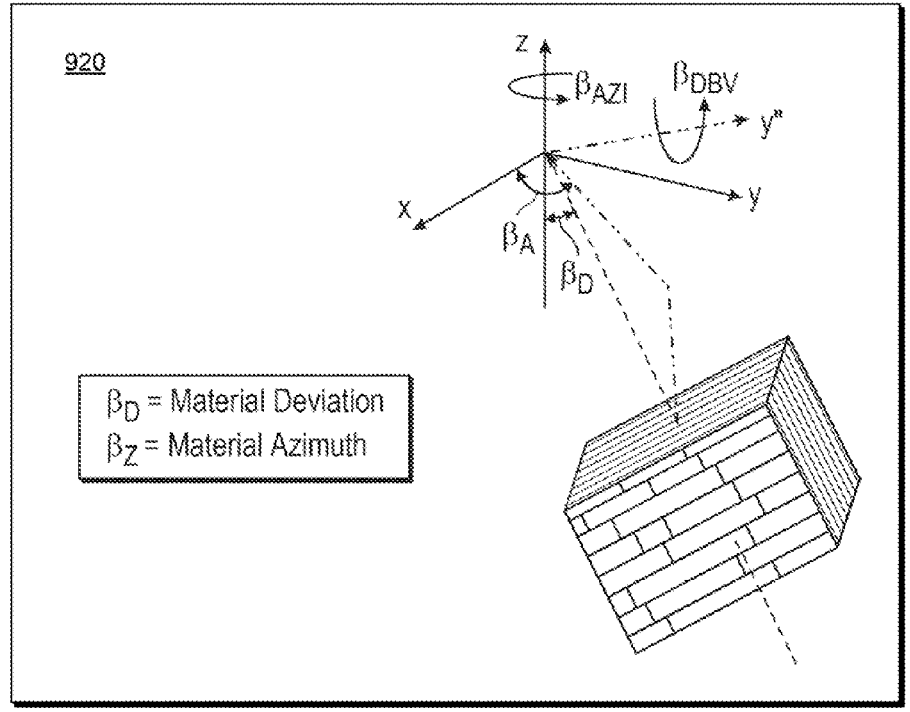

FIG. 9 shows example plots 910 and 920 of an inclined bore in an anisotropic formation in an anisotropic stress environment. The plot 910 shows borehole deviation and borehole azimuth and the plot 920 shows a material symmetry axis's deviation and material azimuth.

Figure 10:
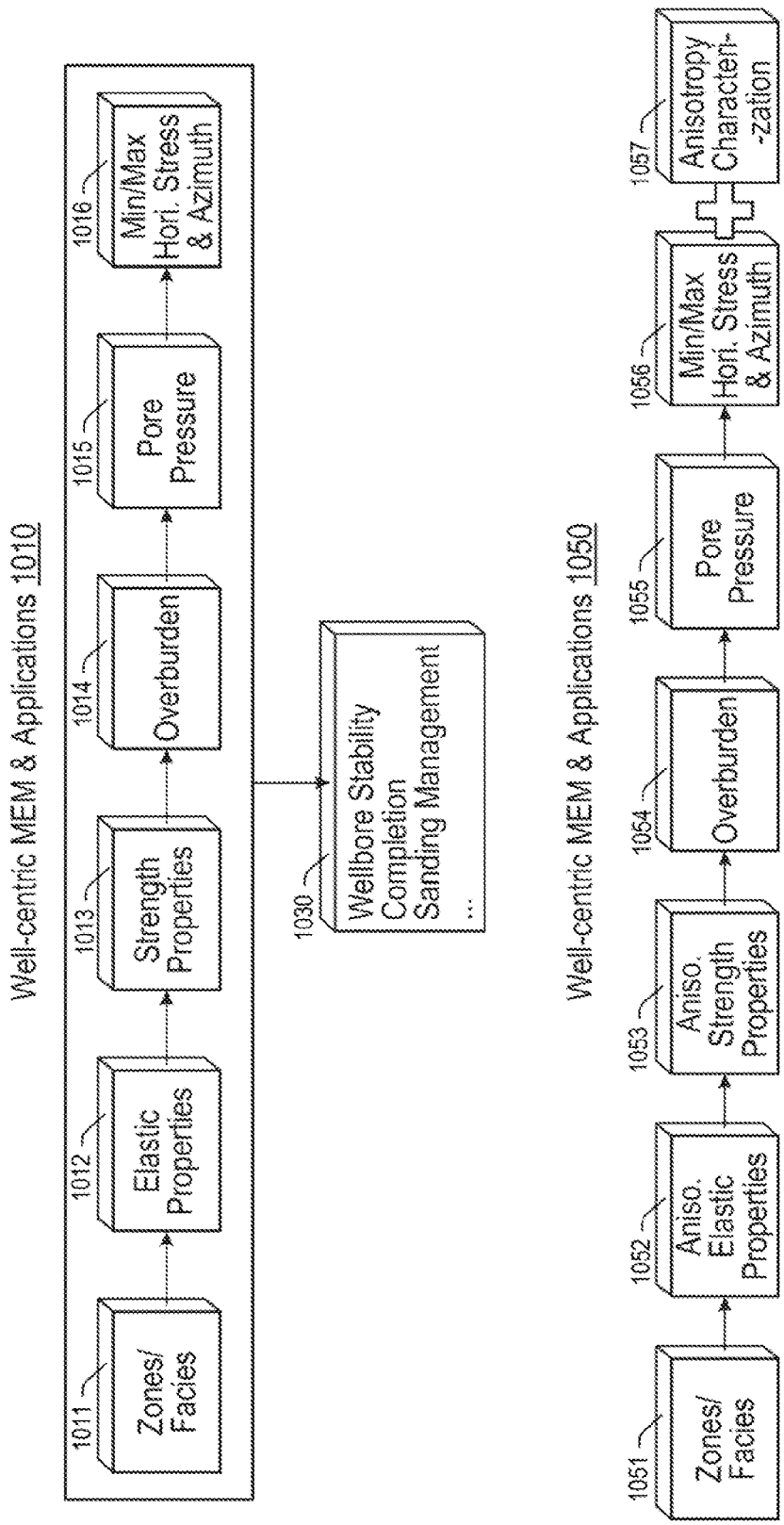
FIG. 10 illustrates examples of workflows.

FIG. 10 shows an example of a workflow 1010 and an example of a workflow 1050. The workflow 1010 includes various blocks 1011 (e.g., zones and/or facies), 1012 (e.g., elastic properties), 1013 (e.g., strength properties), 1014 (e.g., overburden), 1015 (e.g., pore pressure) and 1016 (e.g., stress and azimuth) as to characteristics of an environment that may be, for example, sequential, parallel, etc. For example, the blocks 1011 to 1015 may be performed sequentially in a workflow to provide minimum and maximum horizontal stress and azimuth per the block 1016. As an example, the blocks 1011 to 1016 may provide for outputting information 1030 such as, for example, information germane to one or more of wellbore stability, a completion(s), sanding management, etc.

The workflow 1050 includes various blocks 1051 (e.g., zones and/or facies), 1052 (e.g., anisotropic elastic properties), 1053 (e.g., anisotropic strength properties), 1054 (e.g., overburden), 1055 (e.g., pore pressure), 1056 (e.g., stress and azimuth) and 1057 (e.g., anisotropy characterization) as to characteristics of an environment that may be, for example, sequential, parallel, etc. For example, the blocks 1051 to 1055 may be performed sequentially in a workflow to provide minimum and maximum horizontal stress and azimuth per the block 1056 and/or anisotropic characterization(s) per the block 1057. As an example, the blocks 1051 to 1057 may provide for outputting information such as, for example, information germane to one or more of wellbore stability, a completion(s), sanding management, etc.

As an example, the workflow 1010 and or the workflow 1050 may be part of a workflow such as a MEM workflow. For example, consider a MEM workflow ("well-centric MEM & applications") that may be implemented in a framework, for example, as part of a geomechanics offering (e.g., geomechanics analysis features, etc.). As an example, a modified workflow may account for failure alongside a plane of weakness (see, e.g., anisotropic properties, parameters, etc.). Such a modified workflow may receive input available (log, core, etc.) and provide one or more outputs, for example, for optimizing next well orientation, adjusting mud weight or drilling operation, etc.

As an example, a workflow may address rock failure mechanisms associated with borehole failure. Such a workflow may, for example, utilize data such as FMI data, SONIC SCANNER™ data (Schlumberger Limited, Houston, Tex.), etc.

As an example, various factors can contribute to borehole deformation, failure, etc., particularly, with respect to drilling. For example, consider mechanical factors (e.g., in situ stress), pore pressure, borehole pressure, thermal conditions, etc. As to thermal conditions, an analytical model may be employed to model one or more thermal effects.

Figure 11:
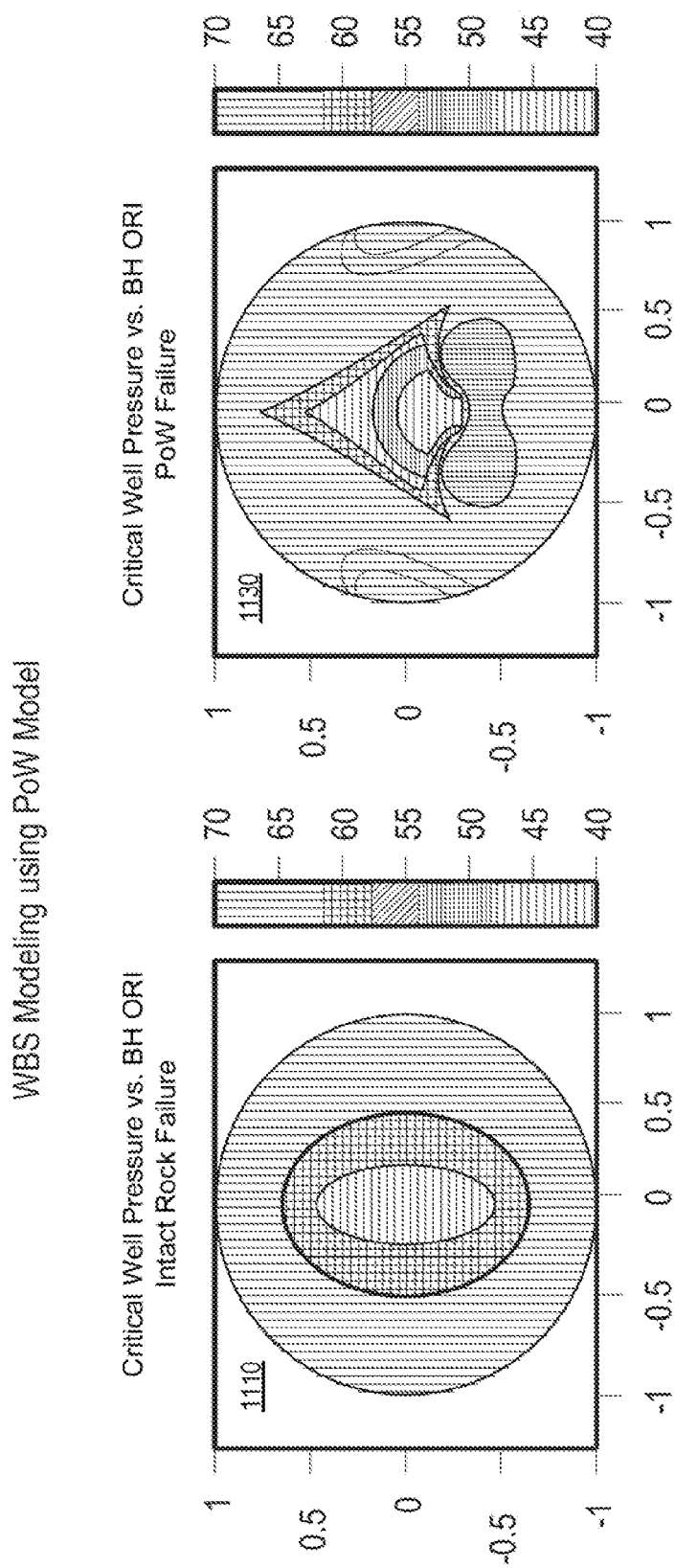
FIG. 11 illustrates example plots of modeling results for a borehole.

FIG. 11 shows example plots 1110 and 1130 of wellbore stability modeling (WBS) using a PoW model. The plot 1110 illustrates critical pressure in a borehole or well (e.g., CPW) versus borehole orientation for intact rock and the plot 1130 illustrates critical pressure in a borehole or well (e.g., CPW) versus borehole orientation for a plane of weakness.

Figure 12:
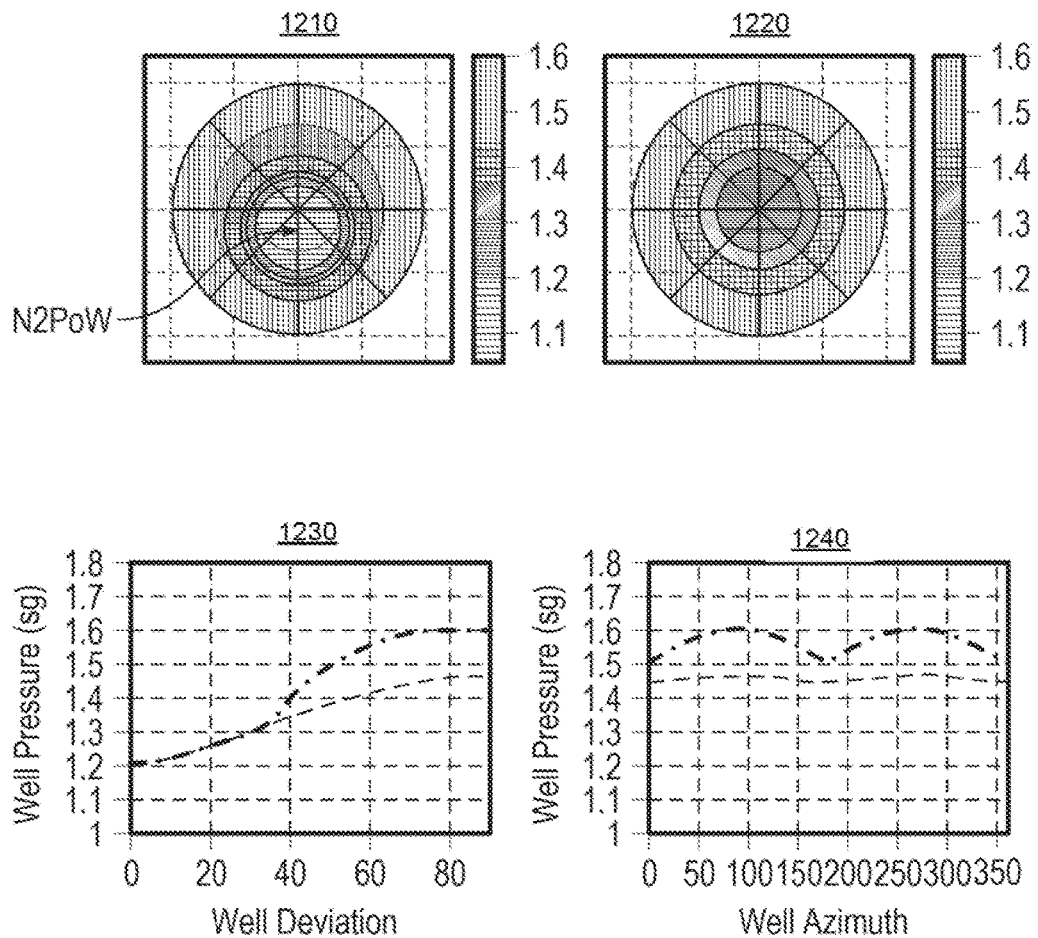
FIG. 12 illustrates example plots of results from two approaches to borehole modeling.

FIG. 12 shows an example set of four plots 1210, 1220, 1230 and 1240. In this example, a formation has laminations dipping to the South at an angle of about 15 degrees. The maximum horizontal stress direction is in oriented East-West. The plot 1210 shows critical mud weight (unit in g/cc) as determined to prevent weakness plane shear sliding as a function of borehole orientation. In FIG. 12, results are displayed on stereoplots 1210 and 1220, in which the radial direction represents the borehole deviation and the azimuth direction represents the borehole azimuth). The weakness plane orientation is indicated by a point labeled "N2PoW". For purpose of comparison, the critical mud weight estimated to prevent intact rock shear failure, using a non-MPoW approach, is shown in the plot 1220. A non-MPoW model ignores the existence of the lamination and natural fractures and leads to an overly optimistic solution (e.g., that may lead to drilling problems). The plot 1230 shows variation of the critical mud weight as a function of borehole deviation (about 0 degrees to about 90 degrees). In this example, the well azimuth is about 70 degrees East of North. The plot 1240 shows variation of the critical mud weight as a function of borehole azimuth (about 0 degrees to about 360 degrees) for a horizontal well, in which the results from the MPoW model and the non-MPoW model are shown, with the thicker line corresponding to results of from implementation of the MPoW model.

The four plots 1210, 1220, 1230 and 1240 of FIG. 12 provide an example as to analysis of borehole stability in a laminated formation (e.g., dipping to South at about 15 degree); the plot 1210 being for critical mud weight (unit in g/cc) as determined to prevent borehole from weakness plane shear sliding induced borehole instability, as a function of borehole orientation; the plot 1220 being for critical mud weight predicted by using a non-MPoW approach (i.e., intact rock shear failure); the plot 1230 being for variation of critical mud weight versus borehole deviation, at an azimuth of about 70 degrees; and the plot 1240 being variation of critical mud weight versus borehole azimuth for a horizontal well. Mud weight is in standard gravity or SG (g/cc) unit.

Figure 13:
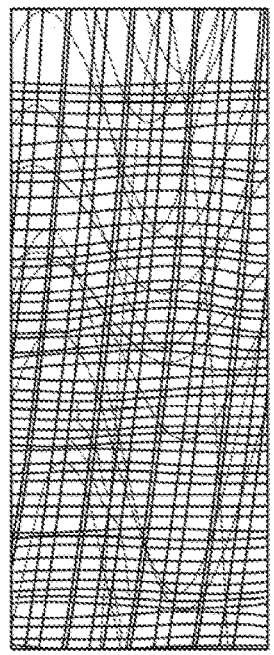
FIG. 13 illustrates examples of data acquisition technique where at least a portion of such data may provide for characterizing anisotropy.
Figure 13:
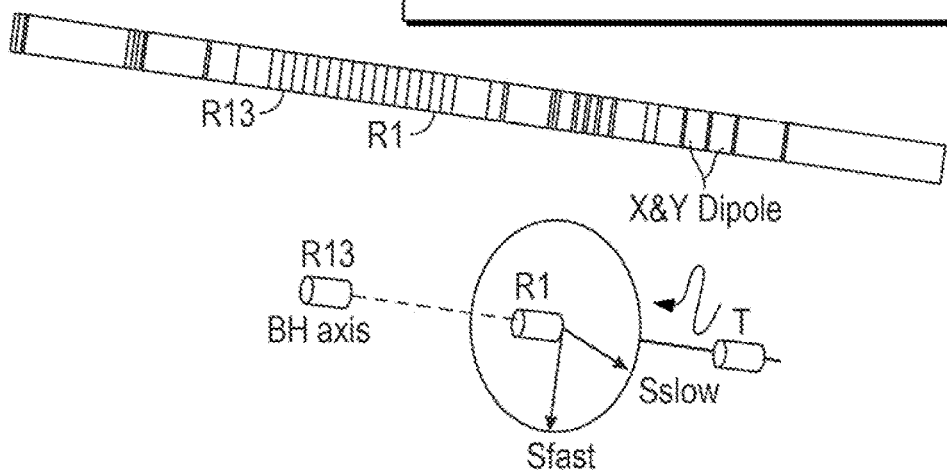

FIG. 13 shows examples of data acquisition techniques 1310 and 1330. The technique 1310 includes acquisition of image data such as image log data. The technique 1310 may acquire data that may indicate bedding features, structural features, fracture features (e.g., natural, stress-induced, hydraulic, etc.), etc. The technique 1330 includes acquisition of sonic data. The technique 1330 may acquire data that may indicate bedding features, layering features, crystalline features, cracks, fracture features, differential stress features, etc. As an example, the sonic data (e.g., seismic data) may be analyzed to provide information as to anisotropy of material or materials, for example, for anisotropy characterization (e.g., as to inputs of a model for analysis of borehole stability, instability, etc.).

As an example, a model may provide for critical well pressure inversion (e.g., intact rock failure and PoW slipping model), for arbitrary well orientation and arbitrary PoW orientation and complex in situ stress environments, interactive sensitivity analysis capability, sensitivity on PoW orientation, sensitivity on borehole orientation, 3D visualization of borehole and layered structure and the PoW sliding failure mechanism and severity, well pressure versus well orientation (e.g., a Schmidt plot) for well trajectory optimization, results QC, etc.

Figure 14:
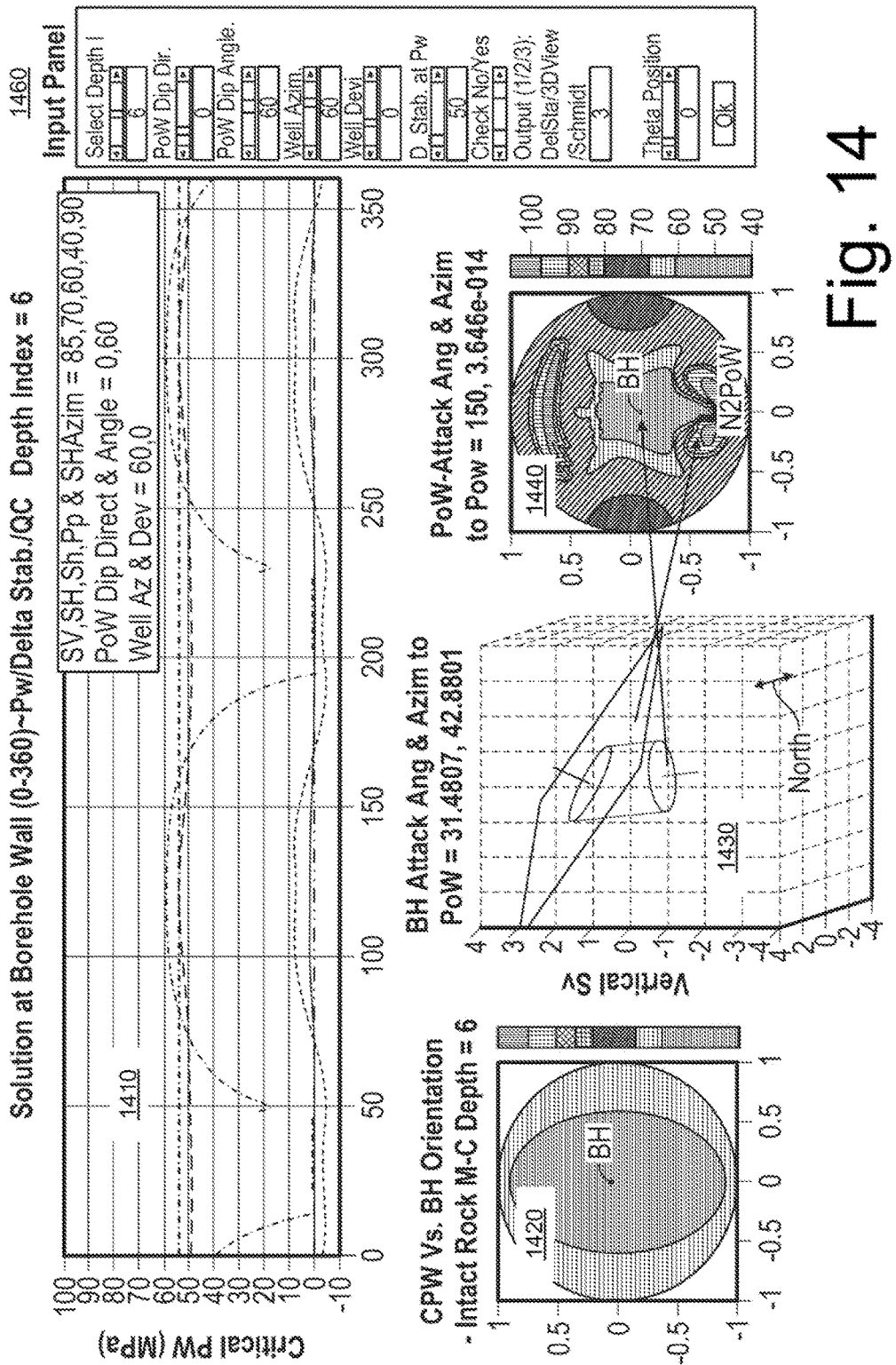
FIG. 14 illustrates various examples of plots of results as to a borehole wall.

FIG. 14 shows various plots 1410, 1420, 1430 and 1440 of results for a borehole wall (e.g., a wall of a borehole). The plot 1410 shows critical pressure versus angle, the plot 1420 shows critical pressure in a stereoplot, the plot 1430 shows the borehole oriented in space, and the plot 1440 shows the borehole axis in a plane of weakness in a stereoplot with attack angle and azimuth to the plane of weakness. As an example, a graphical user interface (GUI) may be rendered to a display, for example, via processor-executable instructions that instruct a system. Such a GUI may include one or more graphical controls, for example, that can control inputs to a workflow, a method, etc. FIG. 14 shows an example of an input panel 1460, which may include one or more controls as to input to a workflow, a method, etc.

Figure 15:
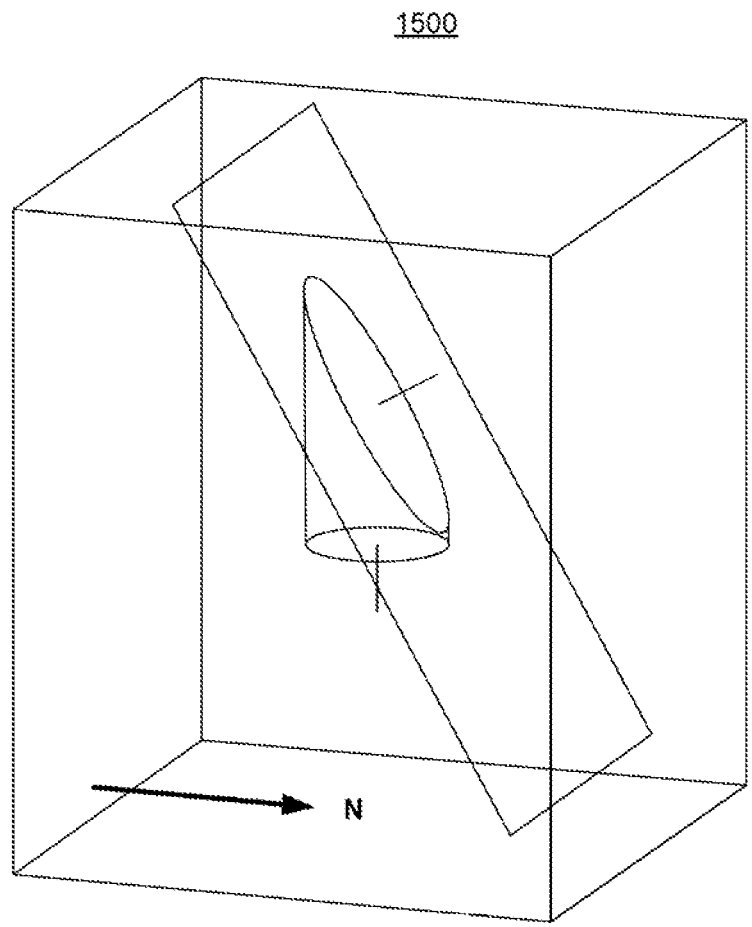
FIG. 15 illustrates an example scenario.

FIG. 15 shows an example scenario 1500 where various input values are set forth that input to a workflow. In the scenario 1500, in situ stress and pore pressure are as follows: SV/SH/Sh/Pp=120/100/60/40 MPa; SH azimuth is East; intact rock properties are as follows: Pr=0.25, UCS=17 MPa, friction angle=30 degrees; PoW strength is as follows; cohesion=1 MPa and friction angle=25 degrees; PoW dip azimuth is as follows: 0 degrees (North); and dip angle is as follows: 30 degrees, 45 degrees and 60 degrees. The scenario 1500 can provide for validation of an approach that may implement a modified plane of weakness model (e.g., a MPoW).

Figure 16:
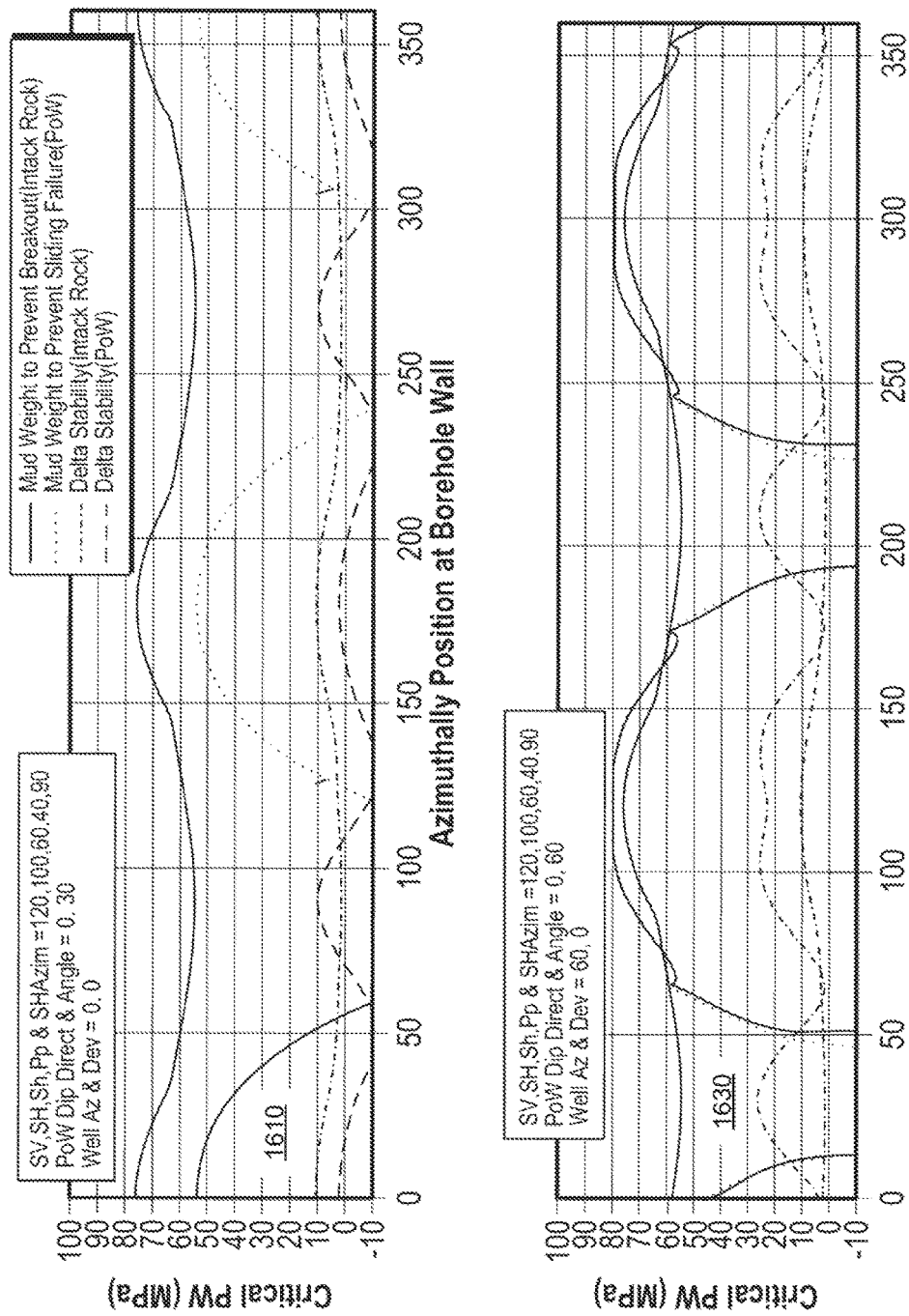
FIG. 16 illustrates various examples of plots of results.

FIG. 16 shows plots 1610 and 1630 of results for the scenario 1500 of FIG. 15.

Figure 17:
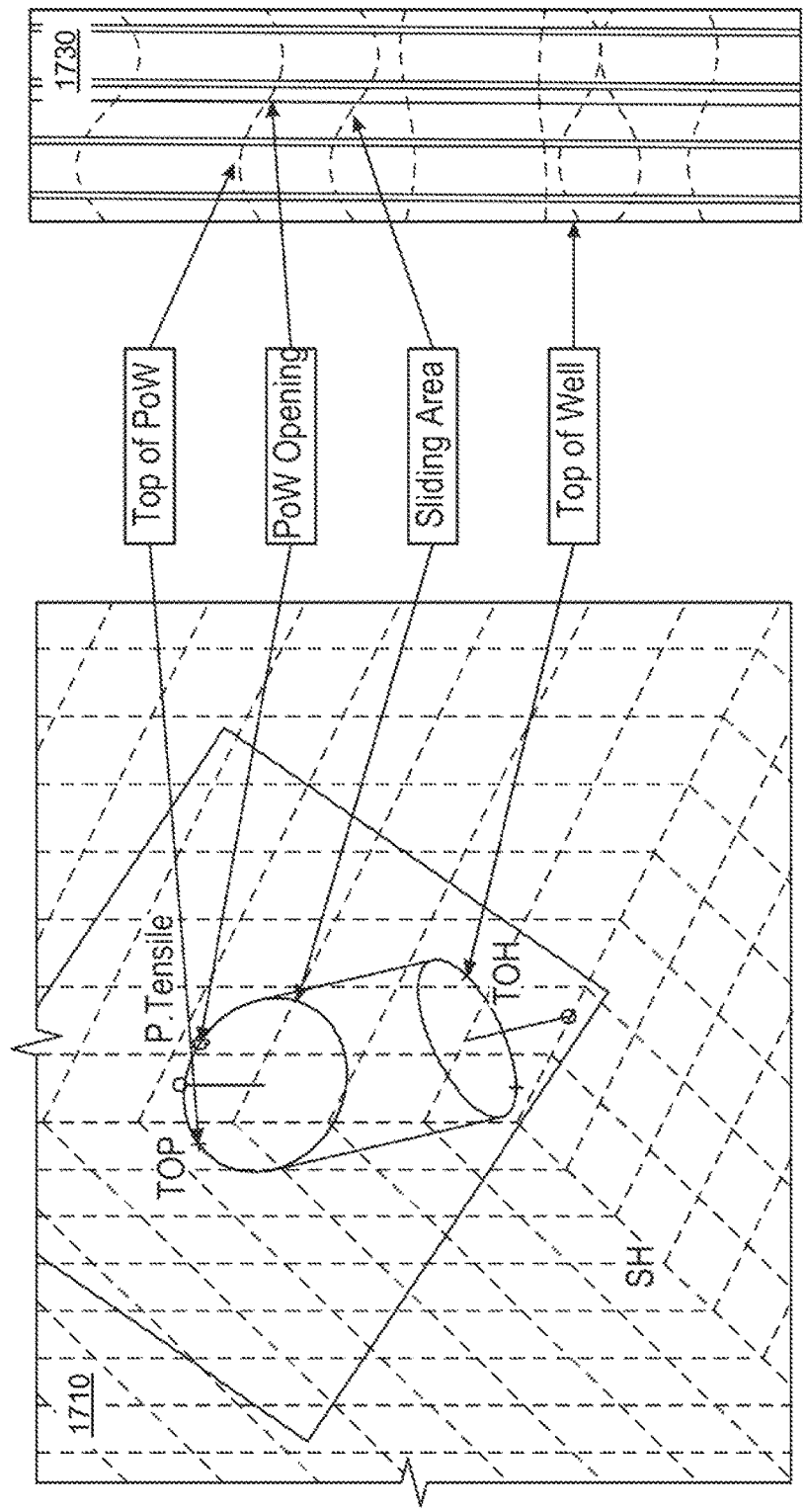
FIG. 17 illustrates examples of plots.

FIG. 17 shows plots 1710 and 1730 where the plot 1710 shows a borehole (e.g., a wellbore or well) in a three-dimensional space and where the plot 1730 may be a plot of borehole data such as image data. As an example, instructions may be stored in memory for rendering of a GUI that can present plots such as the plots 1710 and 1730 of FIG. 17. For example, a GUI may link features of a wire-mesh plot to a data plot. As shown in the example plots 1710 and 1730 of FIG. 17, one or more portions of a bore are identified, for example, with respect to one or more characteristics as to a failure mechanism, a risk of failure, a top of well, a top of a plane of weakness (PoW), etc. As an example, a GUI may include rendered indicia of one or more stresses (e.g., local, far field, etc.).

Figure 18:
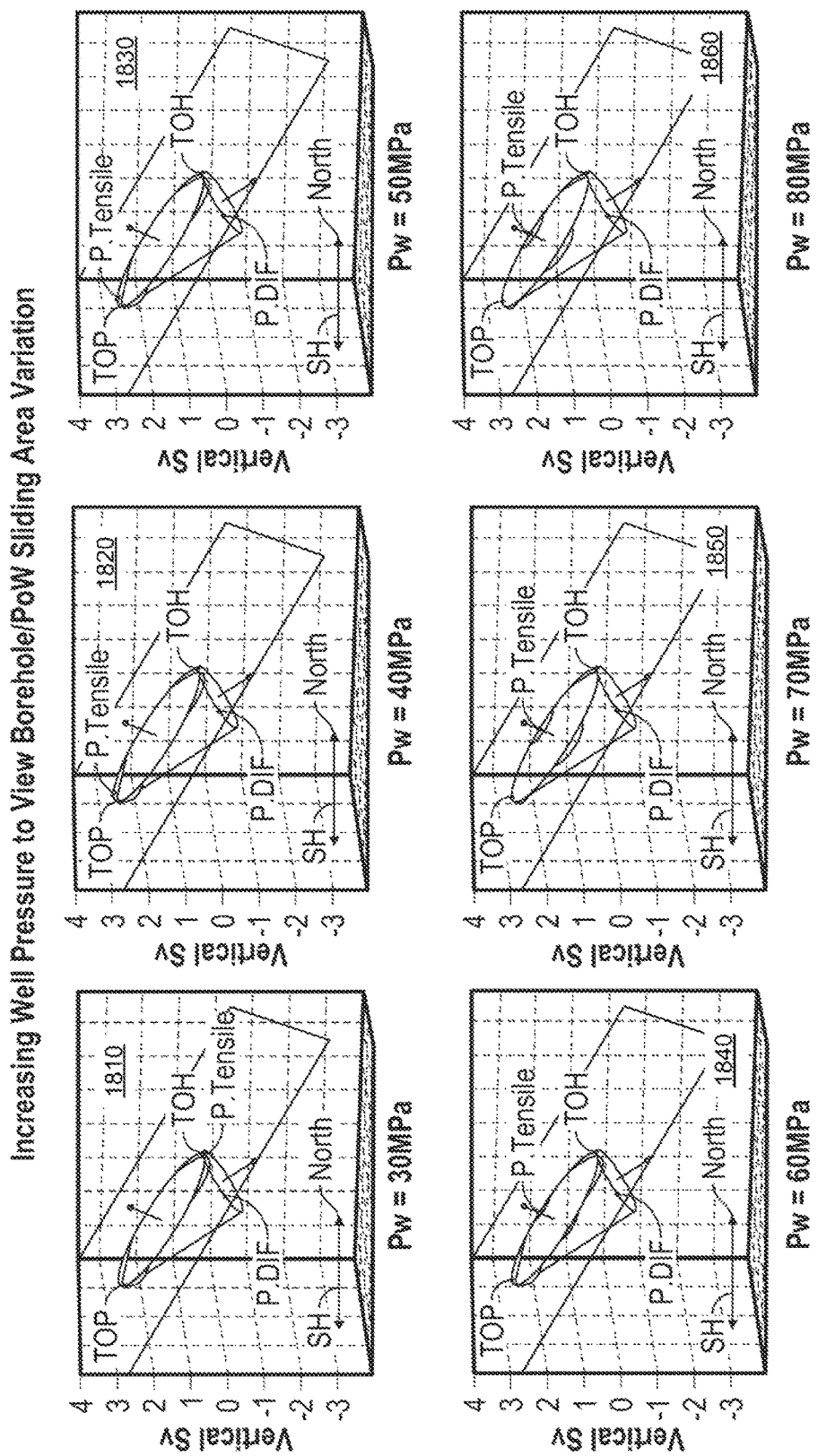
FIG. 18 illustrates various examples of plots with respect to well pressure, for example, as to a bore and plane of weakness sliding area (e.g., variation)

FIG. 18 shows various plots 1810, 1820, 1830, 1840, 1850 and 1860 with respect to well pressure, for example, as to a bore and plane of weakness sliding area (e.g., variation).

Figure 19:
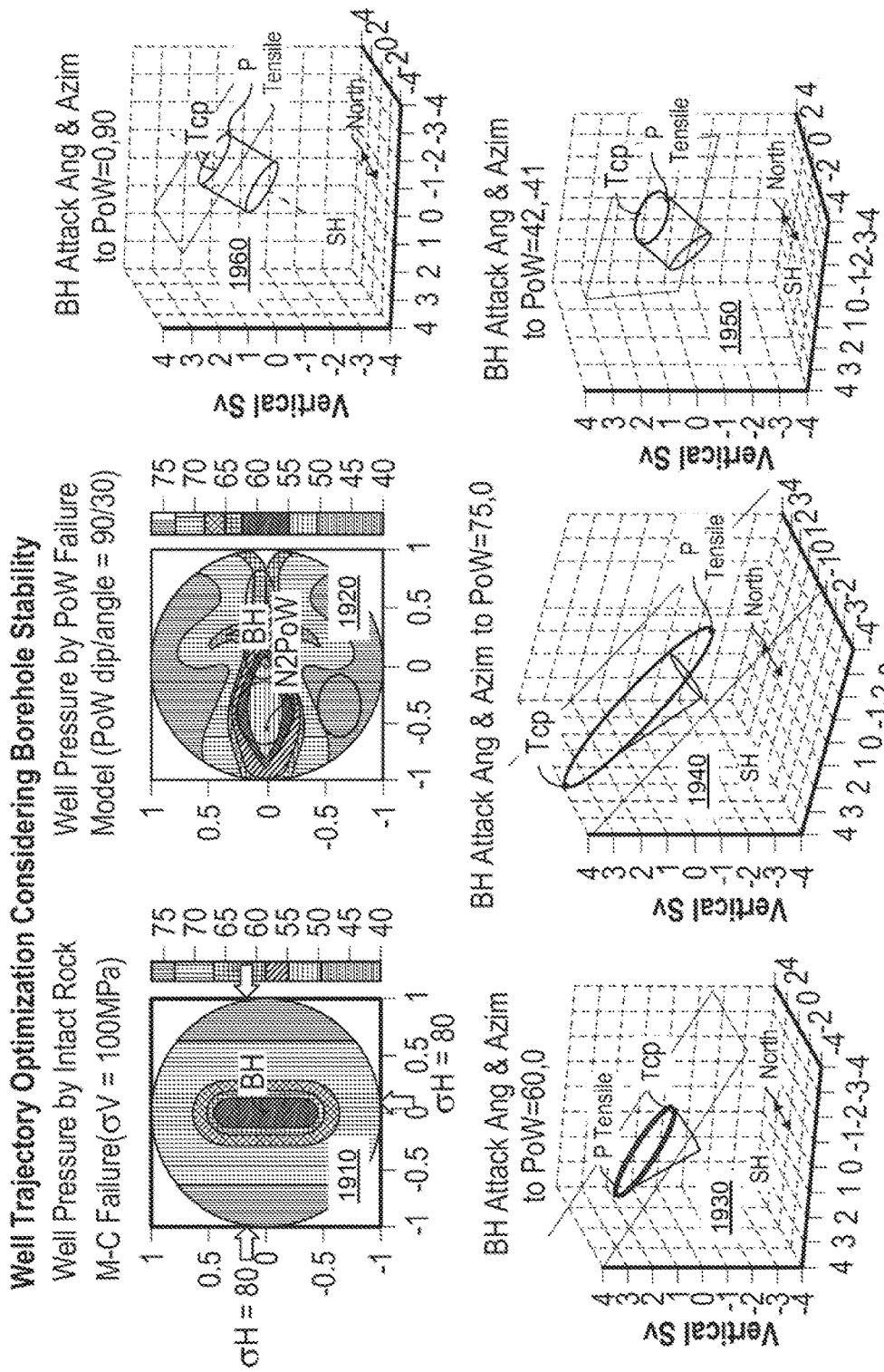
FIG. 19 illustrates various examples of plots as to an example of well trajectory optimization that may consider bore stability.

FIG. 19 shows various plots 1910, 1920, 1930, 1940, 1950 and 1960 as to an example of well trajectory optimization that may consider bore stability.

Figure 20:
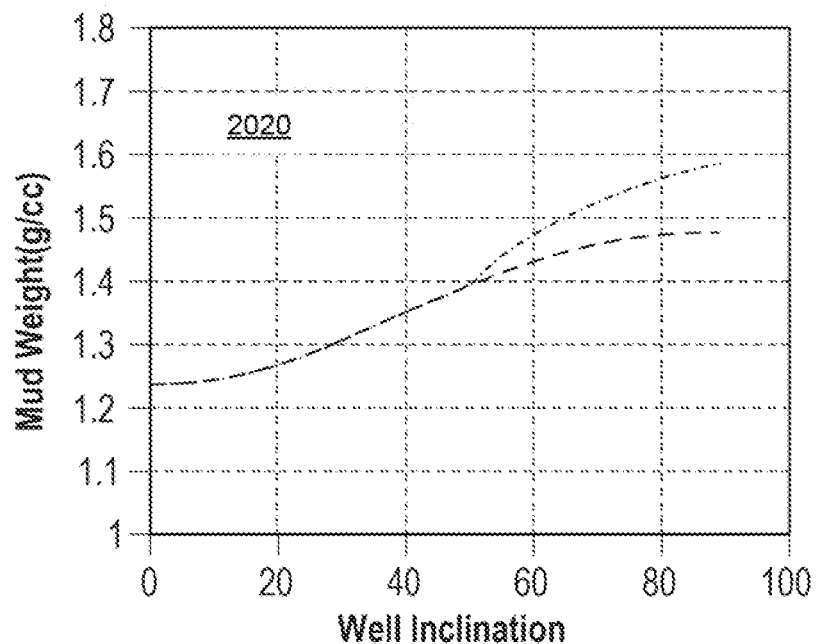
FIG. 20 illustrates examples of various plots of an example workflow that includes a comparison to data.
Figure 20:
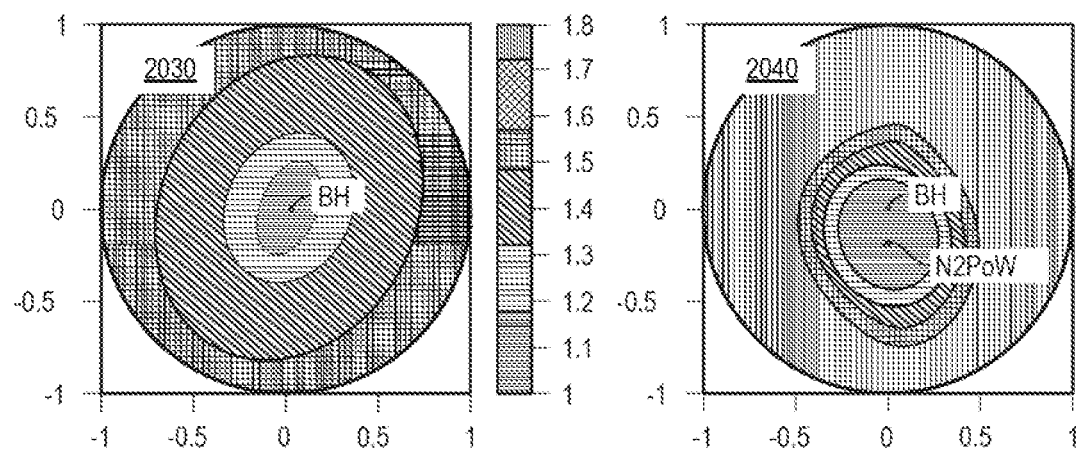

FIG. 20 shows various plots 2020, 2030 and 2040 of an example that includes a comparison to data, for example, from SPE Drilling & Completion, Volume 25, Number 4, December 2010, pp. 518-529, SPE-124464-PA, "Wellbore-Instability Predictions Within the Cretaceous Mudstones, Clair Field, West of Shetlands" by Narayanasamy et al., which is incorporated by reference herein.

As an example, a MPoW model may be implemented to model and predict borehole instability in an anisotropic formation. As an example, such a model may be implemented for optimizing mud weight design, for example, by considering anisotropy rather than assuming rock as about a bore is isotropic. As an example, a method may include diagnosing wellbore instability problems, providing well trajectory design and optimizing in challenged environments, etc. As an example, a MPoW model may provide for optimization of one or more different tools and services (e.g., via anisotropic characterization). As an example, a MPoW model may find use in acoustic/geology, geomechanics, drilling, well-centric geomechanics workflows, etc.

Figure 21:
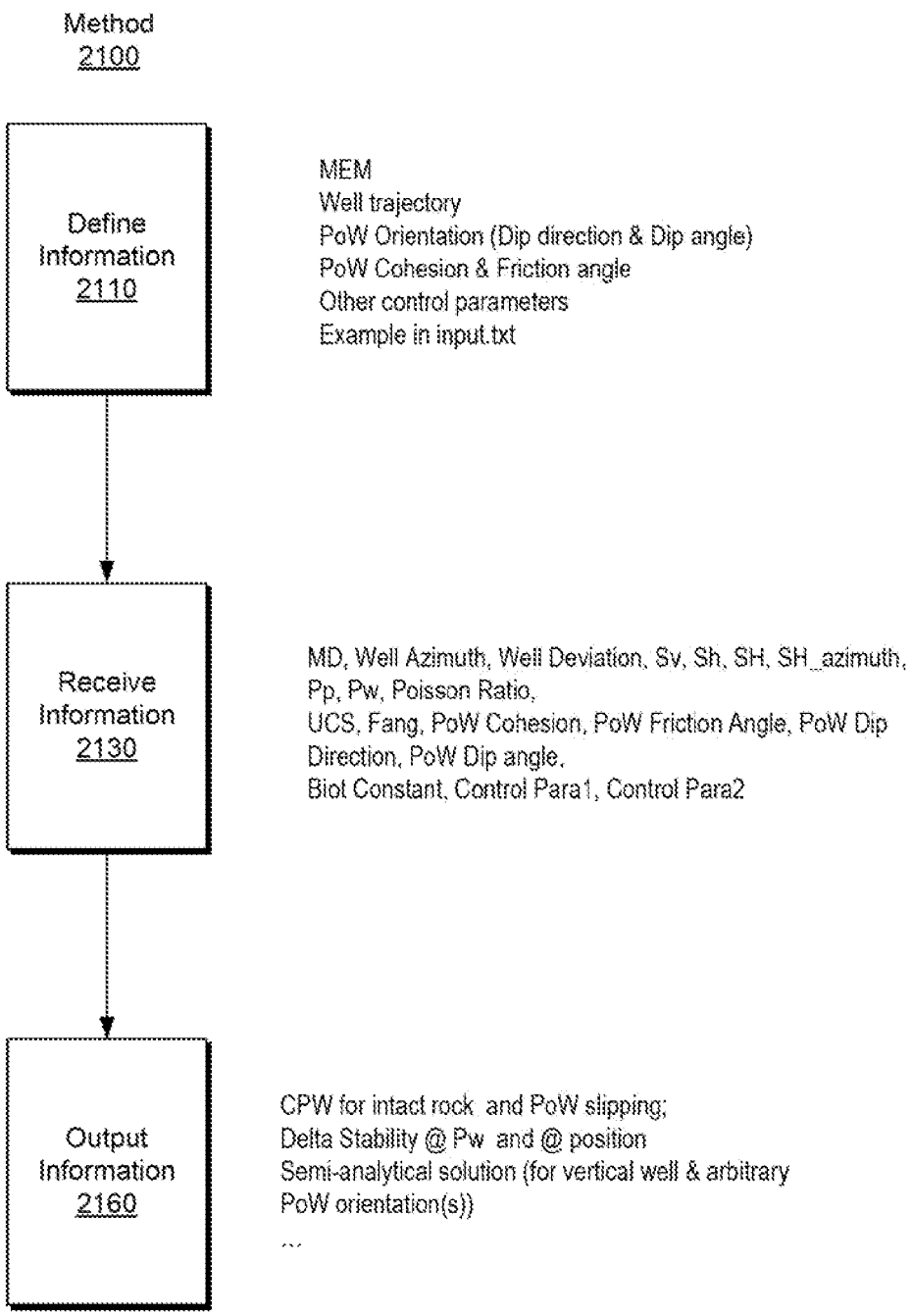
FIG. 21 illustrates an example of a method.

FIG. 21 shows an example of a method 2100 that includes a definition block 2110 for defining information (e.g., parameters, inputs, etc.), a reception block 2130 for receiving information (e.g., via an input file, etc.) and an output block 2160 for outputting information. As an example, the definition block 2110 may define inputs such as a MEM, a well trajectory, a PoW orientation (e.g., dip direction, dip angle, etc.), PoW cohesion and friction angle, one or more control parameters, an input file, etc. As an example, the reception block 2130 may receive information, for example, organized as an input file. In the example of FIG. 21, various parameters are shown that may be defined and for which associated input information may be provided. As an example, output information may include pressures for intact rock and plane of weakness slipping information; delta stability at a pressure (e.g., borehole pressure, well pressure, etc.) and at a position; and, for example, one or more semi-analytical solutions for a borehole orientation (e.g., vertical or other) and/or for an arbitrary PoW orientation.

As an example, information may be received in association with depth. For example, a portion of a borehole may be analyzed over a range of depths. In such an example, a method can include receiving information organized with respect to depth (e.g., increments of depth) over the range of depths (e.g. consider depths of 8250, 8350, 8450, 8650, 8750, 8850, 8950 and 9000).

Figure 22:
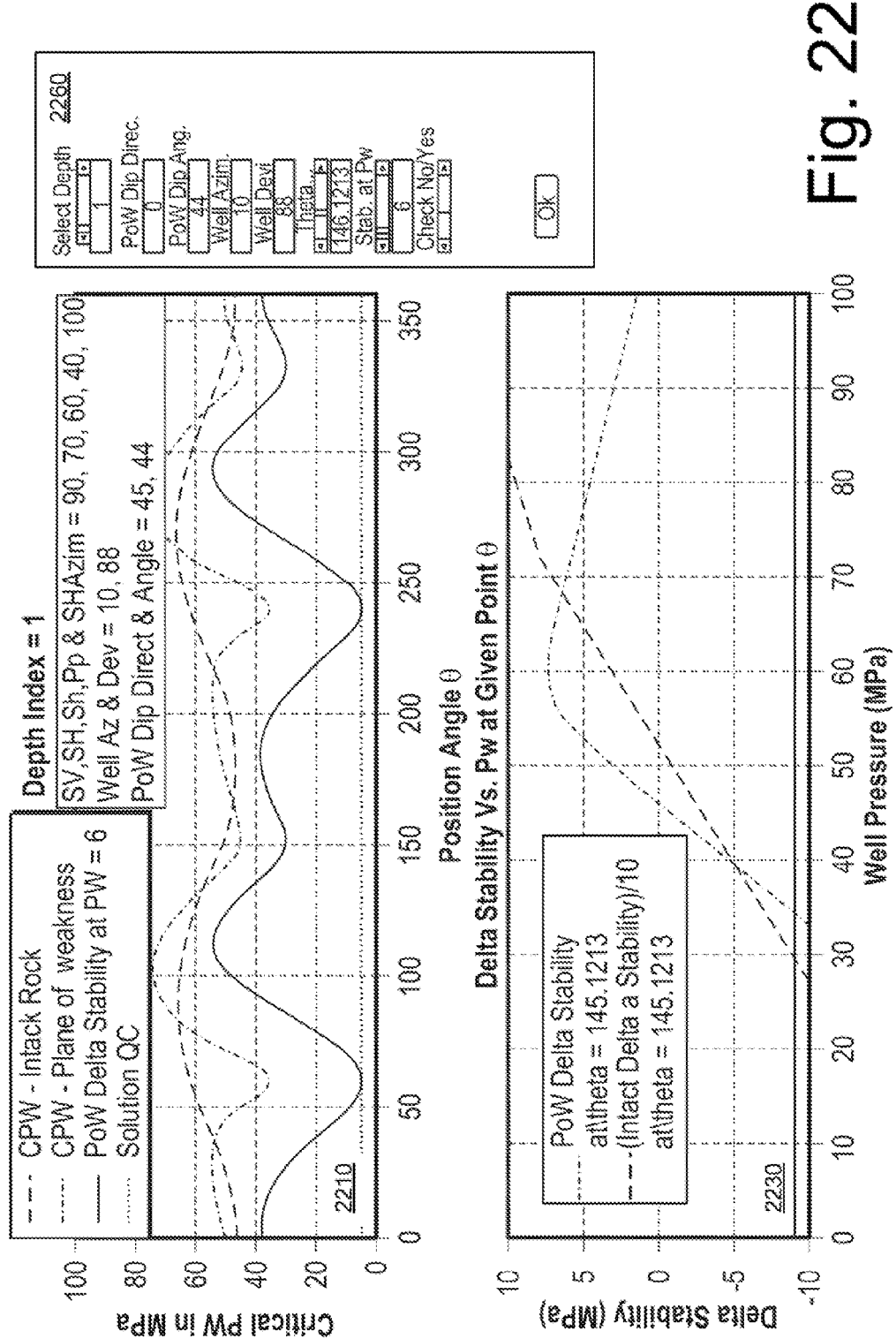
FIG. 22 illustrates examples of plots and examples of graphical controls.

FIG. 22 shows example plots 2210 and 2230 and examples of graphical controls 2260. The plot 2210 shows critical pressure versus angle and the plot 2230 shows delta stability (in units of pressure) versus pressure (e.g., well pressure) The graphical controls 2260 can include a depth select control, a PoW dip direction control, a PoW dip angle control, a bore azimuth control, a bore deviation control, a stability at pressure control, a "check" control (e.g., to check against another solution technique, model, etc.), and a theta position control (e.g., azimuthal position control). As an example, a user may touch a touch screen, move a cursor via a mouse, etc. to instruct a control to adjust, select, etc. a value. As an example, a method may commence responsive to receipt of an instruction and render results to a display (e.g., as one or more plots, etc.). For example, a user may navigate to the "OK" control after making one or more selections via one or more of the graphical controls 2260 of the example of FIG. 22.

Figure 23:
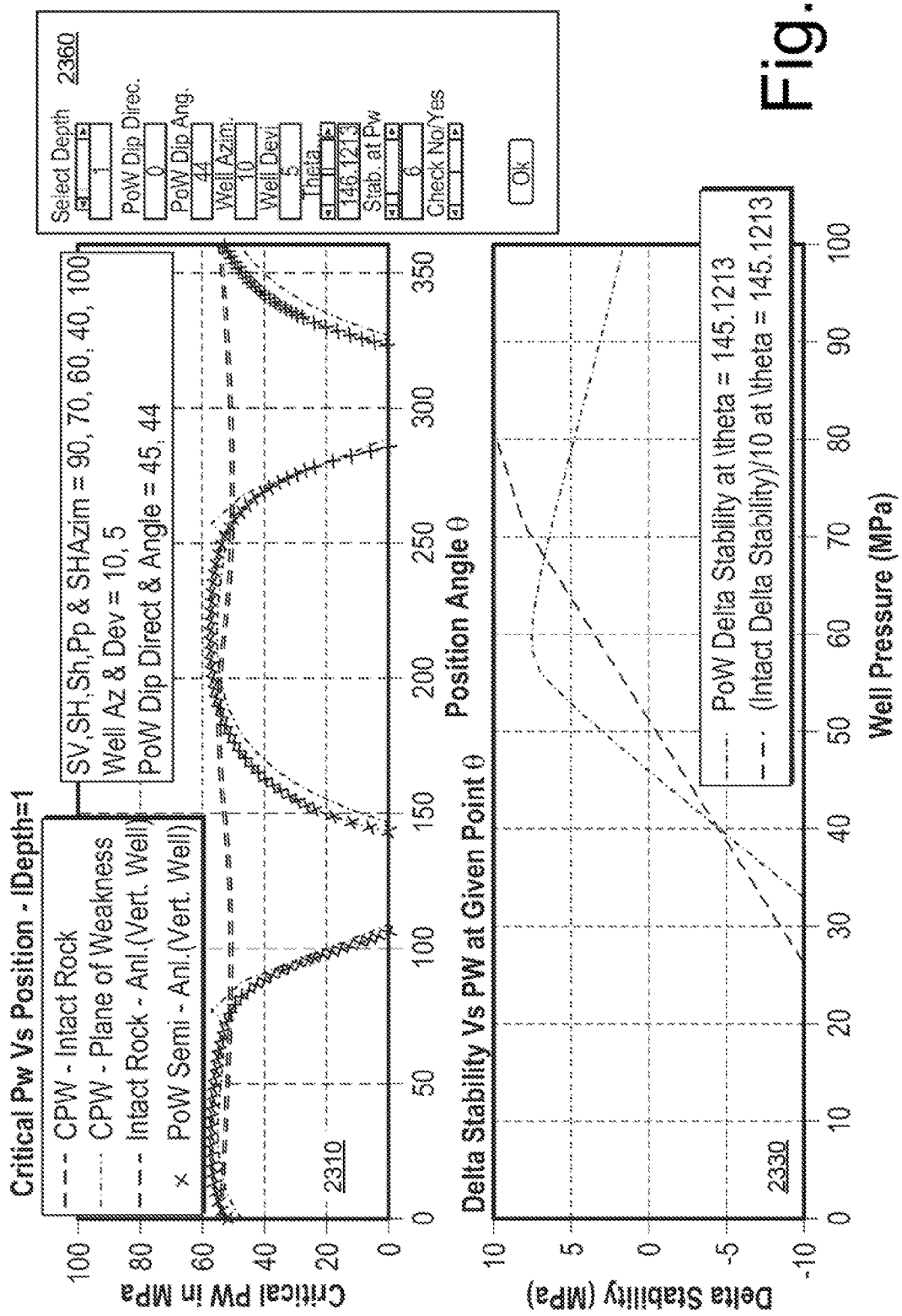
FIG. 23 illustrates examples of plots and examples of graphical controls.

FIG. 23 shows example plots 2310 and 2330 and examples of graphical controls 2360. The plot 2310 shows critical pressure versus angle and the plot 2330 shows delta stability (in units of pressure) versus pressure (e.g., well pressure). The graphical controls 2360 can include a depth select control, a PoW dip direction control, a PoW dip angle control, a bore azimuth control, a bore deviation control, a stability at pressure control, a "check" control (e.g., to check against another solution technique, model, etc.), and a theta position control (e.g., azimuthal position control). As an example, a user may touch a touch screen, move a cursor via a mouse, etc. to instruct a control to adjust, select, etc. a value. As an example, a method may commence responsive to receipt of an instruction and render results to a display (e.g., as one or more plots, etc.). For example, a user may navigate to the "OK" control after making one or more selections via one or more of the graphical controls 2360 of the example of FIG. 23.

Figure 24:
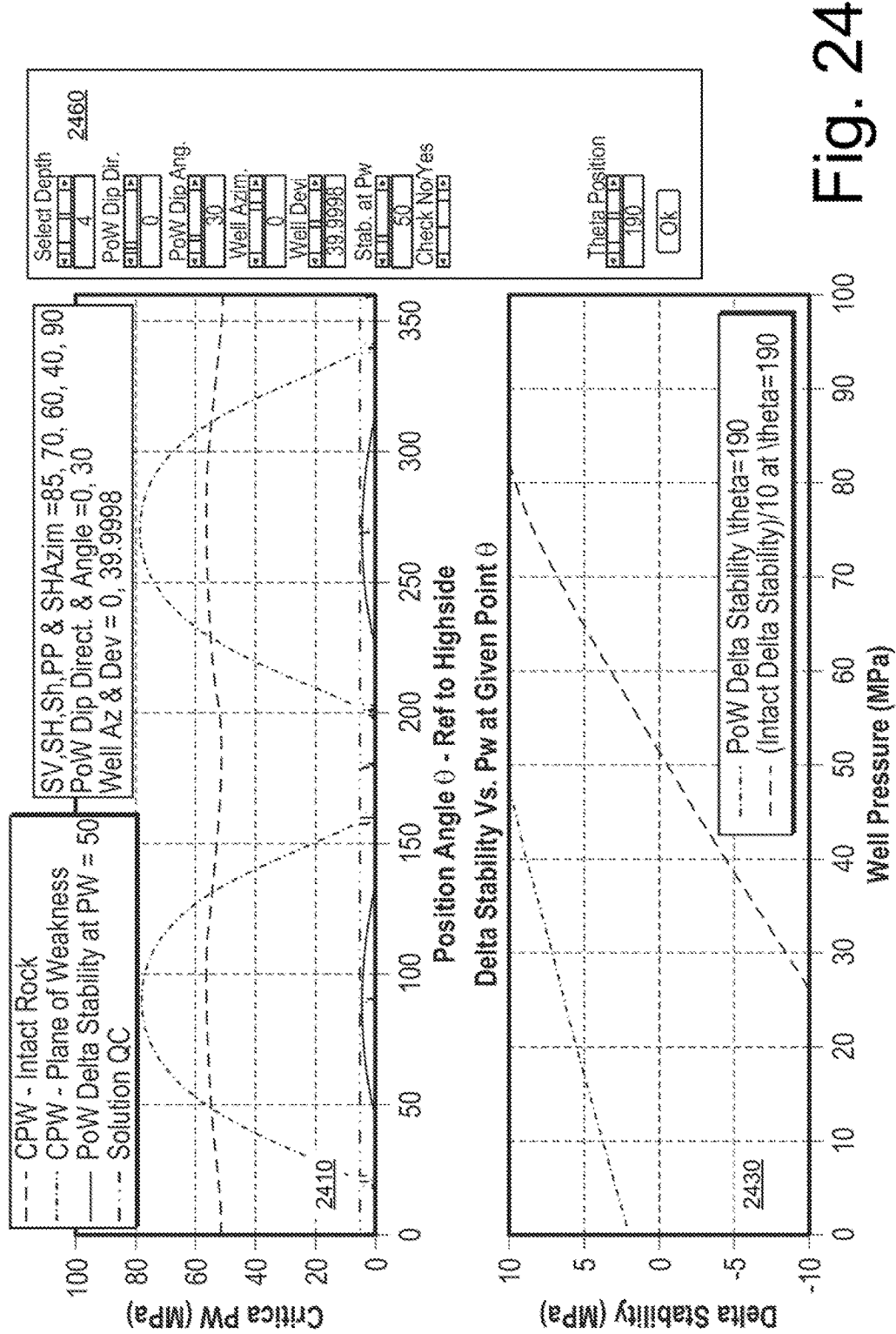
FIG. 24 illustrates examples of plots and examples of graphical controls.

FIG. 24 shows example plots 2410 and 2430 and examples of graphical controls 2460. The plot 2410 shows critical pressure versus angle and the plot 2430 shows delta stability (in units of pressure) versus pressure (e.g., well pressure) The graphical controls 2460 can include a depth select control, a PoW dip direction control, a PoW dip angle control, a bore azimuth control, a bore deviation control, a stability at pressure control, a "check" control (e.g., to check against another solution technique, model, etc.), and a theta position control (e.g., azimuthal position control). As an example, a user may touch a touch screen, move a cursor via a mouse, etc. to instruct a control to adjust, select, etc. a value. As an example, a method may commence responsive to receipt of an instruction and render results to a display (e.g., as one or more plots, etc.). For example, a user may navigate to the "OK" control after making one or more selections via one or more of the graphical controls 2460 of the example of FIG. 24.

Figure 25:
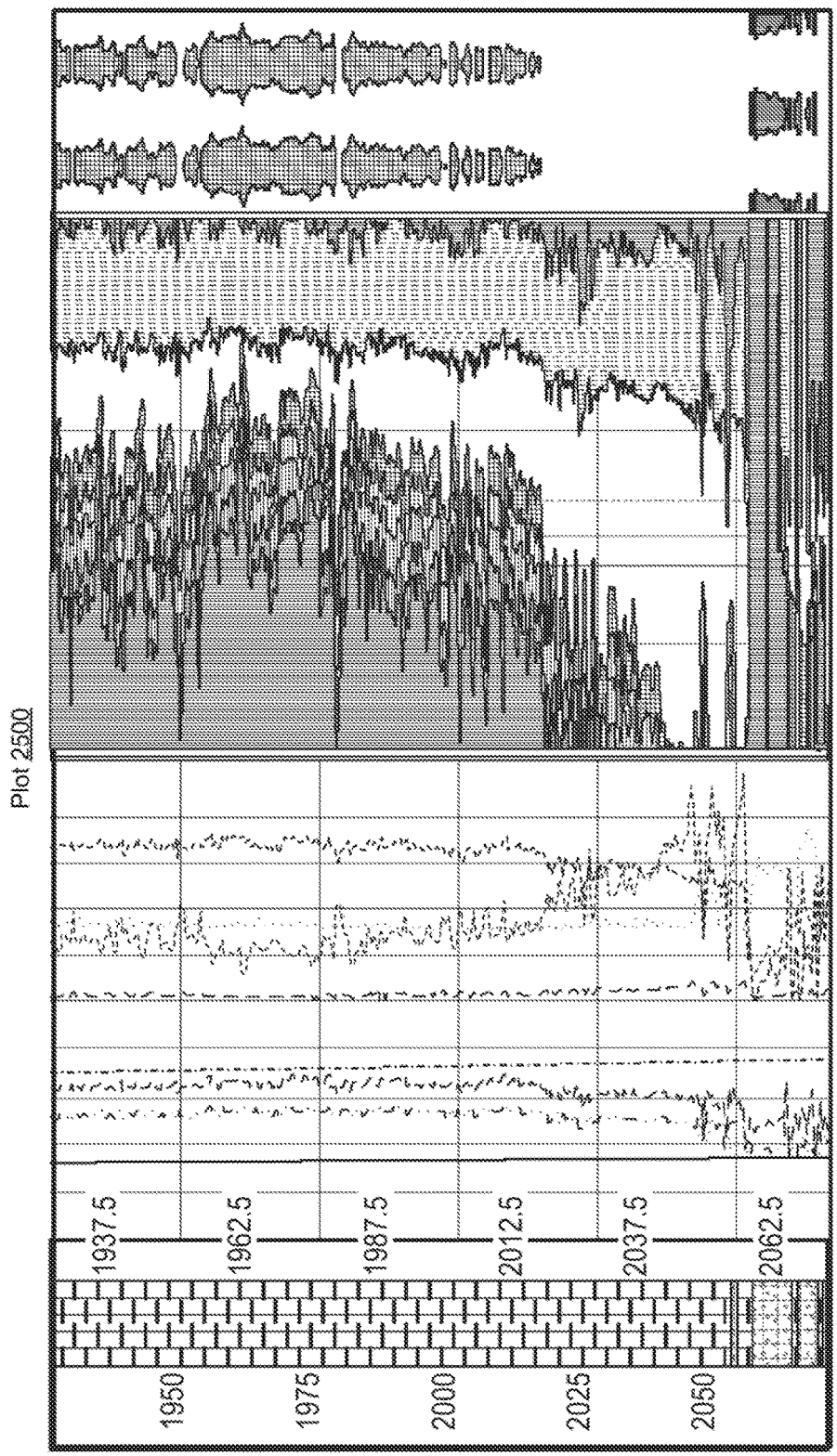
FIG. 25 illustrates examples of plots of various types of data associated with a bore.

FIG. 25 shows an example of a plot 2500 of various types of data associated with a bore. Such data may be log data, seismic data, etc. As an example, data may include inverted data, for example, from solving an inverted problem (e.g., an inverse solution).

As an example, a method can include receiving data that characterizes anisotropy of a formation; receiving a model that models one or more planes of weakness in an anisotropic formation; and, based at least in part on the model and the data, outputting information germane to stability of a bore in an anisotropic formation. In such an example, the anisotropy of the formation can include anisotropy of mechanical rock properties of the formation. In such an example, the anisotropy of mechanical rock properties of the formation can include anisotropy of at least one of elastic, poroelastic, poromechanic, thermomechanic and strength properties of the formation.

As an example, a method can include outputting mud weight information associated with breakout of intact rock of an anisotropic formation into a bore; outputting mud weight information associated with sliding failure of one or more planes of weakness of an anisotropic formation that intersect a bore; outputting pressure sensitivity information associated with breakout of intact rock, with sliding failure of one or more planes of weakness or of breakout of intact rock and sliding failure of one or more planes of weakness; outputting information with respect to azimuthal position of a wall of a bore; and/or outputting bore trajectory information in conjunction with stability information.

As an example, an anisotropic formation can include shale. As an example, an anisotropic formation may include rock other than shale. As an example, an anisotropic formation can include fractured rock, which may be, for example, naturally fractured rock and/or artificially fractured rock (e.g., consider hydraulically fractured rock).

As an example, a model can include one or more terms that model at least one thermal phenomenon. For example, a model may model one or more thermal effects that may influence stress or other forces.

As an example, a model may be or include a model fit to data where, for example, the data include measured data, synthetic data or measured data and synthetic data.

As an example, a system can include a processor; memory operatively coupled to the processor; and one or more modules that include processor-executable instructions stored in the memory to instruct the system to receive data that characterizes anisotropy of a formation; receive a model that models one or more planes of weakness in an anisotropic formation; and, based at least in part on the model and the data, output information germane to stability of a bore in an anisotropic formation. In such an example, the output information can include mud weight information associated with breakout of intact rock of the anisotropic formation into the bore; mud weight information associated with sliding failure of one or more planes of weakness of the anisotropic formation that intersect the bore; and/or pressure sensitivity information associated with breakout of intact rock, with sliding failure of one or more planes of weakness or of breakout of intact rock and sliding failure of one or more planes of weakness.

As an example, one or more computer-readable non-transitory storage media can include computer-executable instructions to instruct a computing system to: receive data that characterizes anisotropy of a formation; receive a model that models one or more planes of weakness in an anisotropic formation; and, based at least in part on the model and the data, output information germane to stability of a bore in an anisotropic formation. In such an example, the output information can include mud weight information associated with breakout of intact rock of the anisotropic formation into the bore; mud weight information associated with sliding failure of one or more planes of weakness of the anisotropic formation that intersect the bore; and/or pressure sensitivity information associated with breakout of intact rock, with sliding failure of one or more planes of weakness or of breakout of intact rock and sliding failure of one or more planes of weakness.

Figure 26:
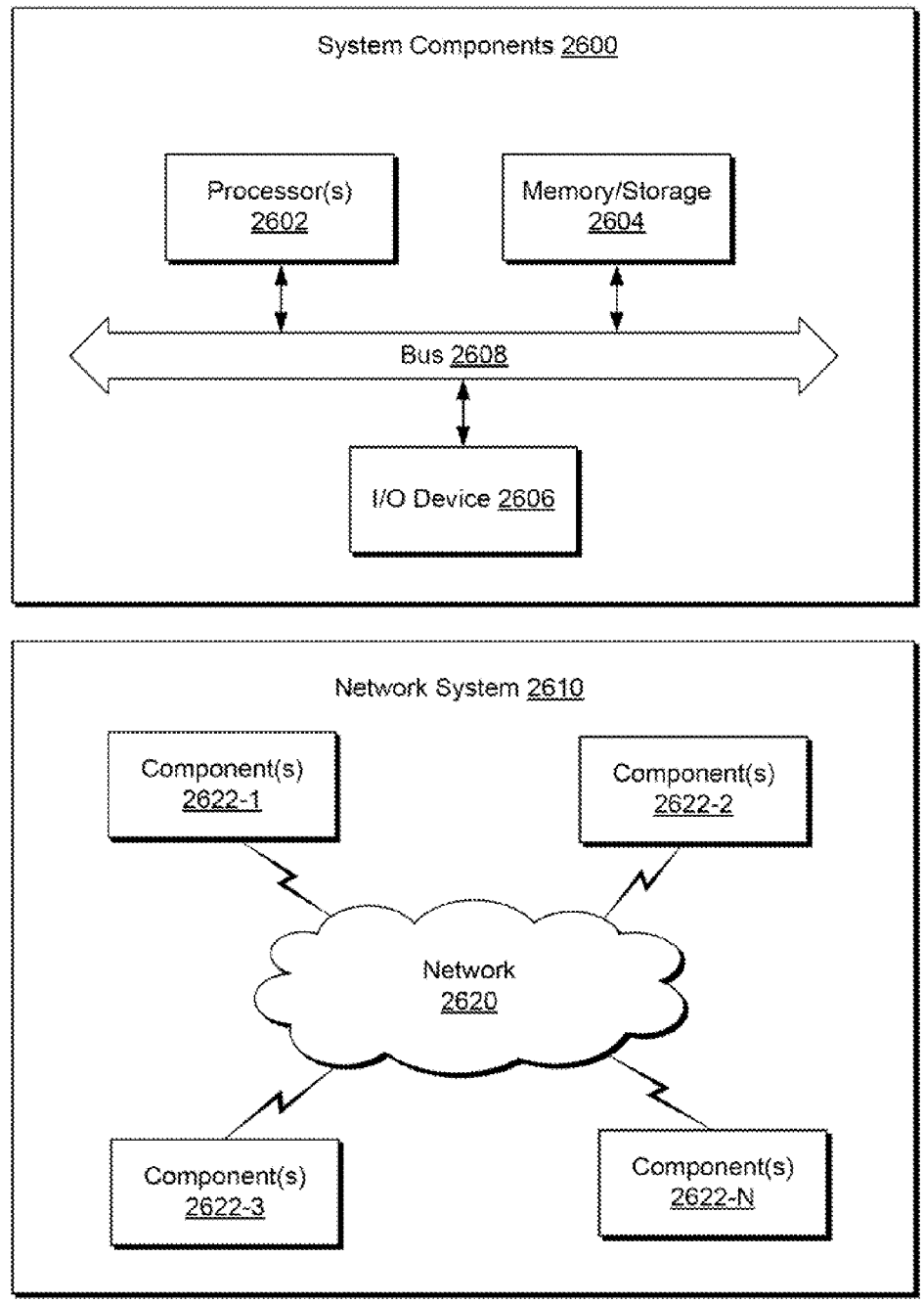
FIG. 26 illustrates example components of a system and a networked system.

FIG. 26 shows components of an example of a computing system 2600 and an example of a networked system 2610. The system 2600 includes one or more processors 2602, memory and/or storage components 2604, one or more input and/or output devices 2606 and a bus 2608. In an example embodiment, instructions may be stored in one or more computer-readable media (e.g., memory/storage components 2604). Such instructions may be read by one or more processors (e.g., the processor(s) 2602) via a communication bus (e.g., the bus 2608), which may be wired or wireless. The one or more processors may execute such instructions to implement (wholly or in part) one or more attributes (e.g., as part of a method). A user may view output from and interact with a process via an I/O device (e.g., the device 2606). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2610. The network system 2610 includes components 2622-1, 2622-2, 2622-3, . . . , 2622-N. For example, the components 2622-1 may include the processor(s) 2602 while the component(s) 2622-3 may include memory accessible by the processor(s) 2602. Further, the component(s) 2602-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

What is claimed is:

1. A method comprising:
   receiving data acquired from a logging tool in a bore drilled in an anisotropic formation wherein the data characterizes anisotropy in the anisotropic formation;
   based on at least a portion of the data, determining an orientation of a plane of weakness in the anisotropic formation;
   receiving a model that models shearing of the plane of weakness in the anisotropic formation based at least in part on the orientation of the plane of weakness and penetration and thermal diffusion of drilling mud into the anisotropic formation; and
   based at least in part on the model, determining a trajectory angle and a mud weight for drilling a stable deviated bore through the plane of weakness in the anisotropic formation.

2. The method of claim 1 wherein the anisotropy of the anisotropic formation comprises anisotropy of mechanical rock properties of the anisotropic formation.

3. The method of claim 2 wherein the anisotropy of mechanical rock properties of the anisotropic formation comprises anisotropy of at least one of elastic, poroelastic, poromechanic, thermomechanic and strength properties of the formation.

4. The method of claim 1 comprising outputting mud weight information associated with breakout of intact rock of the anisotropic formation into the deviated bore.

5. The method of claim 1 comprising outputting mud weight information associated with sliding failure of the plane of weakness of the anisotropic formation that intersects the deviated bore.

6. The method of claim 1 comprising outputting pressure sensitivity information associated with breakout of intact rock, with sliding failure of one or more planes of weakness or of breakout of intact rock and sliding failure of one or more planes of weakness.

7. The method of claim 1 comprising outputting information with respect to azimuthal position of a wall of the deviated bore.

8. The method of claim 1 comprising outputting trajectory information in conjunction with stability information for the deviated bore.

9. The method of claim 1 wherein the anisotropic formation comprises shale and wherein the determining comprises determining a trajectory depth for drilling the deviated bore into one or more layers of the shale.

10. The method of claim 1 wherein the anisotropic formation comprises fractured rock.

11. The method of claim 1 wherein the model comprises one or more terms that model thermal induced stress based at least in part on the thermal diffusion and a volumetric thermal expansion coefficient of rock.

12. The method of claim 1 wherein the model comprises a model fit to data wherein the data comprise measured data, synthetic data or measured data and synthetic data.

13. A system comprising:
   a processor;
   memory operatively coupled to the processor; and
   processor-executable instructions stored in the memory to instruct the system to:
      receive data acquired from a logging tool in a bore drilled in an anisotropic formation wherein the data characterizes anisotropy in the anisotropic formation;
      based on at least a portion of the data, determine an orientation of a plane of weakness in the anisotropic formation;
      receive a model that models shearing of the plane of weakness in the anisotropic formation based at least in part on the orientation of the plane of weakness, and penetration and thermal diffusion of drilling mud into the anisotropic formation; and
      based at least in part on the model, determine a trajectory angle and a mud weight for drilling a stable deviated bore through the plane of weakness in the anisotropic formation.

14. The system of claim 13 comprising processor-executable instructions stored in the memory to instruct the system to output mud weight information associated with breakout of intact rock of the anisotropic formation into the deviated bore.

15. The method of claim 13 comprising processor-executable instructions stored in the memory to instruct the system to output mud weight information associated with sliding failure of one or more planes of weakness of the anisotropic formation that intersect the deviated bore.

16. The method of claim 13 comprising processor-executable instructions stored in the memory to instruct the system to output pressure sensitivity information associated with breakout of intact rock, with sliding failure of one or more planes of weakness or of breakout of intact rock and sliding failure of one or more planes of weakness.

17. One or more computer-readable non-transitory storage media comprising computer-executable instructions to instruct a computing system to:
receive data acquired from a logging tool in a bore drilled in an anisotropic formation wherein the data characterizes anisotropy in the anisotropic formation;
based on at least a portion of the data, determine an orientation of a plane of weakness in the anisotropic formation;
receive a model that models shearing of the plane of weakness in the anisotropic formation based at least in part on the orientation of the plane of weakness and penetration and thermal diffusion of drilling mud into the anisotropic formation; and
based at least in part on the model, determine a trajectory angle and a mud weight for drilling a stable deviated bore through the plane of weakness in the anisotropic formation.

18. The one or more computer-readable non-transitory storage media of claim 17 comprising computer-executable instructions to instruct a computing system to output mud weight information associated with breakout of intact rock of the anisotropic formation into the deviated bore.

19. The one or more computer-readable non-transitory storage media of claim 17 comprising computer-executable instructions to instruct a computing system to output mud weight information associated with sliding failure of one or more planes of weakness of the anisotropic formation that intersect the deviated bore.

20. The one or more computer-readable non-transitory storage media of claim 17 comprising computer-executable instructions to instruct a computing system to output pressure sensitivity information associated with breakout of intact rock, with sliding failure of one or more planes of weakness or of breakout of intact rock and sliding failure of one or more planes of weakness.

* * * * *